(12) United States Patent
Jeon et al.

(10) Patent No.: US 11,005,160 B2
(45) Date of Patent: May 11, 2021

(54) NEAR-FIELD COMMUNICATION ANTENNA DEVICE AND ELECTRONIC DEVICE HAVING SAME

(71) Applicant: Samsung Electronics Co., Ltd., Gyeonggi-do (KR)

(72) Inventors: Seung-Gil Jeon, Gyeonggi-do (KR); Hyeong-Tae Kim, Gyeonggi-do (KR); Jung-Sik Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/767,936

(22) PCT Filed: Nov. 3, 2016

(86) PCT No.: PCT/KR2016/012601
§ 371 (c)(1),
(2) Date: Apr. 12, 2018

(87) PCT Pub. No.: WO2017/082588
PCT Pub. Date: May 18, 2017

(65) Prior Publication Data
US 2018/0309188 A1      Oct. 25, 2018

(30) Foreign Application Priority Data

Nov. 9, 2015    (KR) ........................ 10-2015-0156637

(51) Int. Cl.
*H01Q 1/24*       (2006.01)
*H01Q 1/42*       (2006.01)
(Continued)

(52) U.S. Cl.
CPC .......... *H01Q 1/241* (2013.01); *H01Q 1/2283* (2013.01); *H01Q 1/243* (2013.01); *H01Q 1/38* (2013.01);
(Continued)

(58) Field of Classification Search
CPC ....... H04B 5/005; H04B 5/0025; H01P 3/165; H01P 5/024; H01Q 1/241; H01Q 1/22
See application file for complete search history.

(56) References Cited

U.S. PATENT DOCUMENTS

| 4,983,237 A | 1/1991 | Alfing |
| 5,754,948 A * | 5/1998 | Metze ...................... H04B 7/00 455/41.2 |

(Continued)

FOREIGN PATENT DOCUMENTS

| CN | 1107989 C | 5/2003 |
| CN | 104934671 A | 9/2015 |

(Continued)

OTHER PUBLICATIONS

European Search Report dated Jul. 27, 2018.
Chinese Search Report dated Jul. 30, 2019.
Chinese Search Report dated Apr. 17, 2020.

*Primary Examiner* — Ab Salam Alkassim, Jr.
(74) *Attorney, Agent, or Firm* — Cha & Reiter, LLC

(57) ABSTRACT

Various embodiments related to a near-field (short-range) communication antenna device, which is used for an electronic device, are disclosed. According to an embodiment, a near-field (short-range) communication antenna device may comprise: an electronic device cover unit; a circuit board provided inside the cover unit; a near-field (short-range) communication module, which is mounted on the circuit board, and which comprises a transmitting module and a receiving module; and first and second dielectric body units that face the transmitting module and the receiving module. In addition, various other embodiments are possible.

17 Claims, 27 Drawing Sheets

US 11,005,160 B2
Page 2

(51) Int. Cl.
*H01Q 9/04* (2006.01)
*H01Q 1/22* (2006.01)
*H04B 5/00* (2006.01)
*H01Q 1/38* (2006.01)
*H01Q 13/08* (2006.01)
*H04B 5/06* (2006.01)
*H04B 5/02* (2006.01)

(52) U.S. Cl.
CPC ............ *H01Q 1/42* (2013.01); *H01Q 9/0485* (2013.01); *H01Q 13/08* (2013.01); *H04B 5/0025* (2013.01); *H04B 5/06* (2013.01); *H04B 5/02* (2013.01)

(56) References Cited

U.S. PATENT DOCUMENTS

| | | | |
|---|---|---|---|
| 5,977,841 A * | 11/1999 | Lee | H01P 1/045 333/24 C |
| 5,982,255 A * | 11/1999 | Tanizaki | H01P 3/165 333/239 |
| 6,812,824 B1 * | 11/2004 | Goldinger | G01S 13/84 340/10.1 |
| 7,088,965 B1 * | 8/2006 | Ngan | H01Q 1/243 455/114.2 |
| 7,860,399 B2 * | 12/2010 | Hsieh | H04B 10/40 398/151 |
| 9,351,103 B2 * | 5/2016 | Uchida | H01P 3/127 |
| 9,866,272 B2 * | 1/2018 | Okada | H04B 1/40 |
| 9,887,169 B2 * | 2/2018 | Abdulla | H05K 9/006 |
| 10,256,520 B2 * | 4/2019 | Besel | H04B 5/0031 |
| 10,283,833 B2 * | 5/2019 | Okada | H01P 5/02 |
| 10,720,689 B2 * | 7/2020 | Shook | H01P 3/20 |
| 2007/0001910 A1 * | 1/2007 | Yamanaka | H01Q 1/364 343/700 MS |
| 2007/0164420 A1 * | 7/2007 | Chen | H01L 25/16 257/691 |
| 2008/0106476 A1 | 5/2008 | Tran et al. | |
| 2009/0262023 A1 | 10/2009 | Ying et al. | |
| 2010/0149042 A1 | 6/2010 | Utsi et al. | |
| 2011/0003563 A1 * | 1/2011 | Gorbachov | H01Q 21/0025 455/78 |
| 2011/0012794 A1 | 1/2011 | Schlub et al. | |
| 2012/0188917 A1 * | 7/2012 | Knox | H01Q 1/2225 370/277 |
| 2012/0274419 A1 | 11/2012 | Lee et al. | |
| 2013/0102367 A1 | 4/2013 | Kong | |
| 2013/0183902 A1 | 7/2013 | McCarthy et al. | |
| 2014/0235163 A1 | 8/2014 | Michalske et al. | |
| 2014/0287794 A1 * | 9/2014 | Akhi | H01Q 21/0006 455/550.1 |
| 2015/0004902 A1 * | 1/2015 | Pigott | H01L 28/10 455/41.1 |
| 2015/0085903 A1 * | 3/2015 | Gundel | H05K 1/0239 375/219 |
| 2015/0111496 A1 * | 4/2015 | McCormack | H04B 5/02 455/41.1 |
| 2015/0264515 A1 * | 9/2015 | Uchida | H01P 3/127 455/41.2 |
| 2015/0270595 A1 * | 9/2015 | Okada | H04B 1/40 333/254 |
| 2015/0325908 A1 * | 11/2015 | Reuter | H01L 25/0655 343/700 MS |
| 2017/0324446 A1 * | 11/2017 | Cook | H04B 5/0031 |
| 2018/0212297 A1 * | 7/2018 | Besel | H01P 5/107 |

FOREIGN PATENT DOCUMENTS

| | | |
|---|---|---|
| EP | 2 833 512 A1 | 2/2015 |
| JP | 2011-521513 A | 7/2011 |
| KR | 1990-7002593 A | 12/1990 |
| KR | 10-2011-0058936 A | 6/2011 |
| KR | 10-2011-0122227 A | 11/2011 |
| KR | 10-2012-0044999 A | 5/2012 |
| KR | 10-2013-0043556 A | 4/2013 |
| KR | 10-2013-0076994 A | 7/2013 |
| KR | 10-2015-0109420 A | 10/2015 |

* cited by examiner

NEAR-FIELD COMMUNICATION ANTENNA DEVICE AND ELECTRONIC DEVICE HAVING SAME

CLAIM OF PRIORITY

This application is a National Phase Entry of PCT International Application No. PCT/KR2016/012601, which was filed on Nov. 3, 2016 and claims priority under 35 U.S.C. § 119 to Korean Patent Application No. 10-2015-0156637, which was filed in the Korean Intellectual Property Office on Nov. 9, 2015, the contents of which are incorporated herein by reference.

TECHNICAL SOLUTION

Technical Field

Various embodiments of the present disclosure relate to an electronic device adopting a near-field (short-range) communication antenna device.

Background Art

Near-field (short-range) communication is a generic term encompassing near-field (short-range) wireless personal area network (WPAN) technologies, standards, and products for realizing bidirectional near-field (short-range) communication between portable devices at low cost without complicated cables, and is one of the key technologies of a near-field (short-range) wireless personal area network such as ultra-wide band (UWB) communication technology and ZigBee communication technology.

Near-field (short-range) communication is widely used in portable devices such as mobile phones, headsets, and the like. Near-field (short-range) communication chips implementing near-field (short-range) communication technology are small and inexpensive and have low power consumption, thereby enabling wireless connection between portable devices, such as mobile phones, personal digital assistants (PDAs), or portable computers, and network access points or other peripheral devices across short distances of 10 mm to 100 mm.

Near-field (short-range) communication supports high-speed/high-capacity communication using a band of several tens of GHz (e.g., 60 GHz), and thus an antenna suitable for a near-field (short-range) frequency band is required for realizing the near-field (short-range) communication. Portable devices, such as mobile phones, personal digital assistants (PDAs), or smart phones, also require a near-field (short-range) communication antenna device for realizing near-field (short-range) communication, thereby enabling transmission and reception of a frequency of a near-field (short-range) band using the near-field (short-range) communication antenna device.

The near-field (short-range) communication antenna device has a wireless communication distance of only a few tens of millimeters (mm) between wireless portable electronic devices because it has a high propagation loss per unit distance at a high frequency for high-speed data communication. Therefore, near-field (short-range) communication antenna devices must secure an appropriate "proximity distance" between each other in order to perform effective transmission/reception. This feature enables transmission and reception by the devices located within the "proximity distance" and reduces the possibility of interference with distant devices outside of the "proximity distance".

As a result, frequency reusability may be improved to thus form a transmission/reception link using the same near-field (short-range) communication frequency channel in a limited space.

DETAILED DESCRIPTION OF THE INVENTION

Technical Problem

However, since the conventional near-field (short-range) communication antenna devices require a very short distance between portable electronic devices in order to maintain a radio channel, two portable electronic devices actually performing ultra-high speed near-field (short-range) wireless communication must remain close enough to come into contact with each other for securing the radio channel.

That is, the near-field (short-range) communication antenna devices in portable electronic devices must be mechanically and accurately aligned with each another in order to maintain a proper communication channel, and if the electronic devices are not accurately aligned, so that the directions of radiation patterns of the near-field (short-range) communication antenna devices mismatch each other, communication efficiency drastically deteriorates.

Accordingly, in order to cope with the above problems, there is a need to improve the communication performance using a dielectric body having a cross-sectional area and for a mechanism for fixing the dielectric body to the portable electronic device.

Various embodiments of the present disclosure may provide a near-field (short-range) communication antenna device used for an electronic device, which configures first and second dielectric bodies that are physically and directly connected to transmitting and receiving modules of a near-field (short-range) communication module provided in the electronic device, thereby improving transmission/reception efficiency of near-field (short-range) communication and minimizing cross-talk of a channel frequency.

Technical Solution

According to various embodiments of the present disclosure, a near-field (short-range) communication antenna device used in an electronic device may include: an electronic device cover unit; a circuit board configured to be provided inside the cover unit; a near-field (short-range) communication module configured to be mounted on the circuit board and configured to include a transmitting module and a receiving module; and first and second dielectric bodies configured to face the transmitting module and the receiving module.

According to various embodiments of the present disclosure, the first and second dielectric bodies may be integrally provided on an inner surface of the cover unit.

According to various embodiments of the present disclosure, the first and second dielectric bodies may act as waveguides for transmitting radio signals of the transmitting module and the receiving module.

According to various embodiments of the present disclosure, the first and second dielectric bodies may act as gaskets for transmitting radio signals of the transmitting module and the receiving module.

According to various embodiments of the present disclosure, a near-field (short-range) communication antenna device used in an electronic device may include: an electronic device cover unit; a circuit board configured to be provided inside the cover unit; a near-field (short-range) communication module configured to include a transmitting module and a receiving module, which are mounted on the circuit board; and first and second dielectric bodies configured to be provided between the cover unit and the near-field (short-range) communication module and configured to protrude a predetermined length from the cover unit so as to face the transmitting module and the receiving module.

According to various embodiments of the present disclosure, a near-field (short-range) communication antenna device used in an electronic device may include: an electronic device cover unit; a circuit board configured to be provided inside the cover unit; a near-field (short-range) communication module configured to include a transmitting module and a receiving module, which are mounted on the circuit board; a first dielectric body configured to be provided between the cover unit and the near-field (short-range) communication module and configured to protrude a predetermined length from the cover unit so as to face the transmitting module; a second dielectric body configured to be provided between the cover unit and the near-field (short-range) communication module and configured to protrude a predetermined length from the cover unit so as to face the receiving module; a third dielectric body configured to be provided between the transmitting module and the first dielectric body; and a fourth dielectric body configured to be provided between the receiving module and the second dielectric body.

According to various embodiments of the present disclosure, a near-field (short-range) communication antenna device used in an electronic device may include: an electronic device cover unit; a circuit board configured to be provided inside the cover unit;

a near-field (short-range) communication module configured to include a transmitting module and a receiving module, which are mounted on the circuit board; a first dielectric body configured to be provided on an upper surface of the transmitting module; and a second dielectric body configured be provided on an upper surface of the receiving module.

According to various embodiments of the present disclosure, a near-field (short-range) communication antenna device used in an electronic device may include: an electronic device cover unit; a circuit board configured to be provided inside the cover unit; a near-field (short-range) communication module configured to include a transmitting module and a receiving module, which are mounted on a first surface of the circuit board; a gap configured to be formed on a second surface opposite the first surface of the circuit board; a first dielectric body configured to be provided in the transmitting module; and a second dielectric body configured to be provided in the receiving module.

According to various embodiments of the present disclosure, the near-field (short-range) communication antenna device may include: an electronic device cover unit; a circuit board configured to be provided inside the cover unit; a first near-field (short-range) communication module configured to include a first transmitting module and a first receiving module, which are provided on a first surface of the circuit board; a second near-field (short-range) communication module configured to include a second transmitting module and a second receiving module, which are provided on a second surface opposite the first surface of the circuit board; first and second dielectric bodies configured to be provided between the cover unit and the near-field (short-range) communication modules and configured to protrude a predetermined length from the cover unit so as to face the first transmitting module and the first receiving module; and third and fourth dielectric bodies configured to face the second transmitting module and the second receiving module.

Advantageous Effects

According to various embodiments of the present disclosure, it is possible to improve the transmission/reception efficiency of near-field (short-range) communication by configuring first and second dielectric bodies that are physically and directly connected to transmitting and receiving modules of a near-field (short-range) communication module, and it is possible to minimize cross-talk of channel frequencies by preventing radio interference. In addition, the first and second dielectric bodies are formed integrally with a cover unit of an electronic device to thus improve the fixing force to the electronic device, and the first and second dielectric bodies can be provided in a narrow space in the electronic device, thereby enabling the reduction in the size of the product and slimness thereof and improving the portability of the product.

Furthermore, since the first and second dielectric bodies can be configured to have various relative-dielectric constants different from each other, it is possible to implement the same to be divided into two or more channel frequency regions, thereby separating the channel frequencies and reducing inter-channel frequency interference.

BRIEF DESCRIPTION OF DRAWINGS

The above and other aspects, features, and advantages of the present disclosure will be more apparent from the following detailed description taken in conjunction with the accompanying drawings, in which.

MODE FOR CARRYING OUT THE INVENTION

Figure 1:
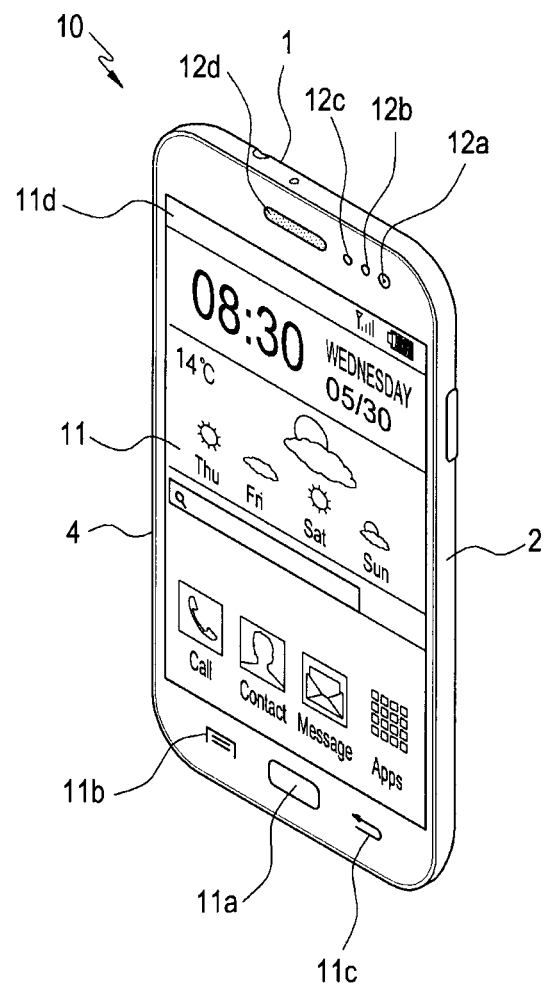
FIG. 1 is a perspective view illustrating a front side of an electronic device adopting a near-field (short-range) communication antenna device according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

Figure 2:
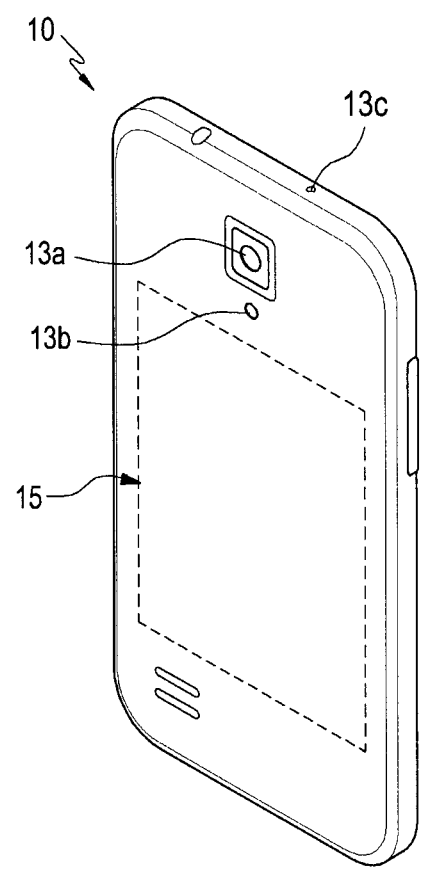
FIG. 2 is a perspective view illustrating a back side of an electronic device adopting a near-field (short-range) communication antenna device according to various embodiments of the present disclosure.

FIG. 1 is a perspective view illustrating a front side of an electronic device. FIG. 2 is a perspective view illustrating a back side of an electronic device (e.g., an electronic device). The electronic device 10 may be a smart phone or a wearable device. Components of an electronic device, such as a smart phone, will be described with reference to FIGS. 1 and 2.

As shown in FIG. 1, a touch screen 11 may be disposed in the center of a front side of the electronic device 10. The touch screen 11 may occupy most of the front side of the electronic device 10. FIG. 1 shows an example in which a main home screen is displayed on the touch screen 11. The main home screen is displayed first on the touch screen 11 when the electronic device 10 is turned on. In the case where the electronic device 10 has several pages of different home screens, the main home screen may be the first home screen, among the several pages of home screens. The home screen may display icons for executing frequently used applications, a main menu switch key, time, weather, or the like. The main menu switch key may display a menu screen on the touch screen 11. In addition, a status bar 11d may be formed at an upper portion of the touch screen 11 in order to display the status, such as the battery charging status, the received signal strength, or the current time. A home key 11a, a menu button 11b, and a back button 11c may be formed at a lower portion of the touch screen 11.

The home key 11a may display a main home screen on the touch screen 11. For example, when the home key 11a is touched while the touch screen 11 displays any home screen other than the main home screen or displays a menu screen, the main home screen may be displayed on the touch screen 11. In addition, when the home key 11a is touched while applications are executed on the touch screen 11, the main home screen may be displayed on the touch screen 11. Further, the home key 11a may be used to display, on the touch screen 11, applications that have recently been used, or a task manager. The menu button 11b may provide connected menus that may be used on the touch screen 11. The connected menus may include a widget addition menu, a background screen change menu, a search menu, an edit menu, a setting menu, or the like. The back button 11c may display a screen that was executed immediately before the currently executed screen, or may terminate the most recently used application.

According to various embodiments of the present disclosure, a first camera 12a, an illuminance sensor 12b, a proximity sensor 12c, or a speaker 12d may be provided in an upper portion of the front side of the electronic device 10. As shown in FIG. 2, a second camera 13a, a flash 13b, or a speaker 13c may be provided on the back side of the electronic device 10. If the electronic device 10 is configured to have a detachable battery pack, the bottom surface of the electronic device 10 may be a detachable battery cover 15.

In addition, a display unit of the electronic device may be designed to be more luxurious by minimizing a bezel area to further increase a display area, to provide a flexible display unit, or to implement a convex or concave display unit.

That is, the edge portion of the display unit may be bent so that the screen area may be extended to the side portion for usage. The configuration, in which the screen area of the display unit is bent so as to extend to the side portion, allows a screen area to be enlarged for usage or a separate screen to be provided in the side portion while ensuring a luxurious design. In other words, the display unit includes a first view area and second view areas provided respectively on either side of the first view area.

Figure 3:
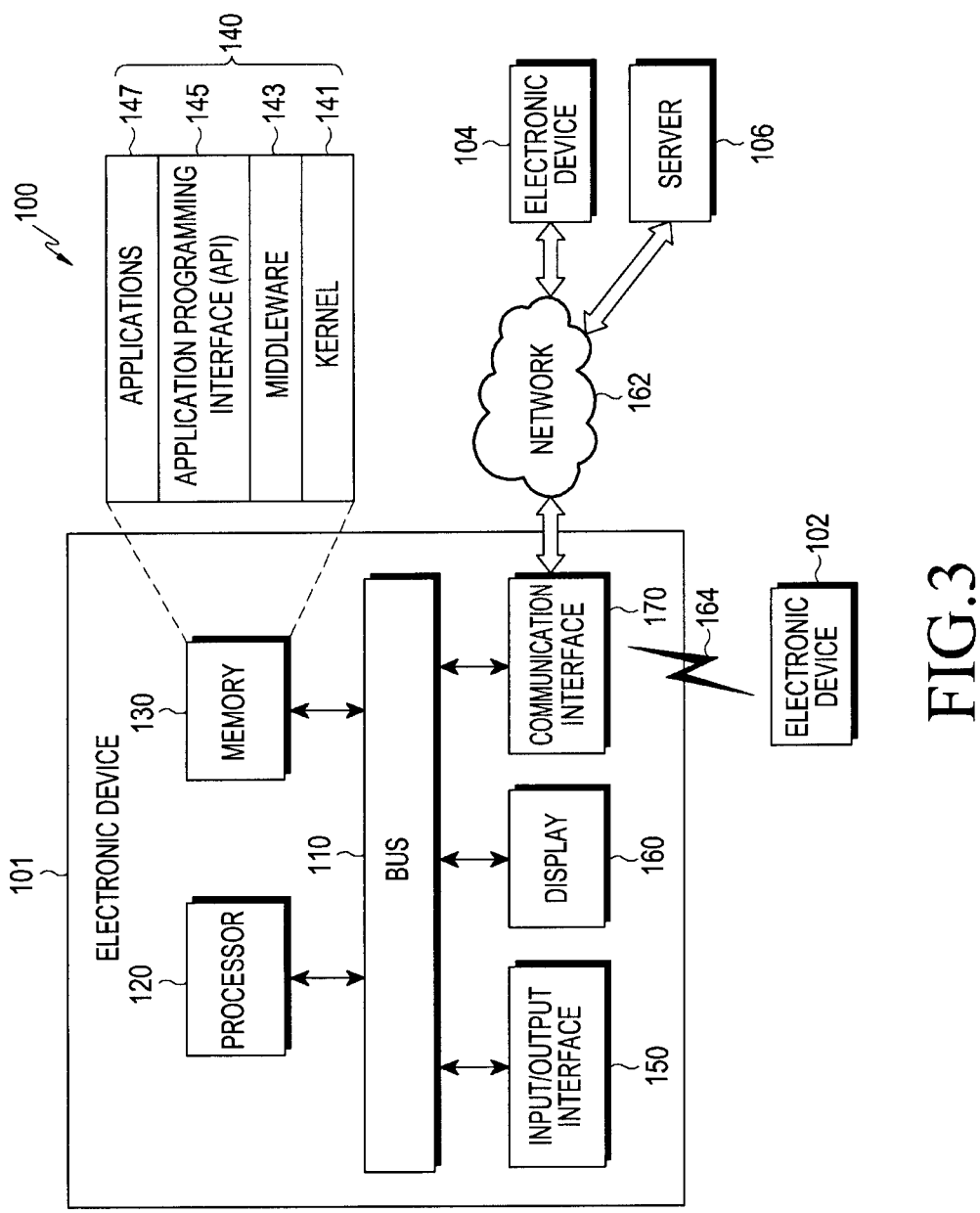
FIG. 3 is a block diagram illustrating a network environment including an electronic device according to various embodiments of the present disclosure.

Referring to FIG. 3, an electronic device 10 in a network environment 100 is described according to various embodiments. The electronic device 10 may include a bus 110, a processor 120, a memory 130, an input/output interface 150, a display 160, and a communication interface 170. In some embodiments, the electronic device 10 may exclude one or more elements or may add other elements thereto.

The bus 110, for example, may include a circuit for connecting the elements 110 to 170 with each other and transmitting communication data (e.g., control messages and/or data) between the elements.

The processor 120 may include at least one of a central processing unit (CPU), an application processor (AP), or a communication processor (CP). The processor 120, for example, may process a calculation or data that is related to the control and/or communication of one or more other elements of the electronic device 10.

The memory 130 may include a volatile and/or non-volatile memory. For example, the memory 130 may store commands or data in relation to one or more other elements of the electronic device 10. According to an embodiment, the memory 130 may store software and/or programs 140. For example, the programs 140 may include a kernel 141, middleware 143, an application programming interface (API) 145, and/or an application programs (or "applications") 147. At least some of the kernel 141, the middleware 143, or the API 145 may be referred to as an operating system (OS).

The kernel 141, for example, may control or manage system resources (e.g., the bus 110, the processor 120, or the memory 130), which are used to execute the operation or function that is implemented in other programs (e.g., the middleware 143, the API 145, or the application programs 147). In addition, the kernel 141 may provide an interface by which the middleware 143, the API 145, or the application programs 147 may access each element of the electronic device 10 for control or management of system resources.

The middleware 143, for example, may play the intermediate role between the API 145 or the application programs 147 and the kernel 141 to communicate with each other for the transmission and reception of data.

The middleware 143 may process one or more operation requests that are received from the application programs 147 according to the priority. For example, the middleware 143 may give priority for using the system resources (e.g., the bus 110, the processor 120, or the memory 130) of the electronic device 10 to at least one of the application programs 147. For example, the middleware 143 may perform scheduling or load balancing for the one or more operation requests by processing the one or more operation requests according to the priority given to the one or more application programs.

The API 145, for example, may be an interface by which the applications 147 control functions that are provided by the kernel 141 or the middleware 143. For example, the API 145 may include one or more interfaces or functions (e.g., instructions) for file control, window control, image processing, or text control.

The input/output interface 150, for example, may play the role of an interface that transfers commands or data received from a user or other external devices to other elements of the electronic device 10. For example, the input/output interface 150 may output commands or data received from the other elements of the electronic device 10 to the user or the other external devices.

The display 160, for example, may include a liquid crystal display (LCD), an LED (light-emitting diode) display, an organic LED (organic light-emitting diode) display, a microelectromechanical systems (MEMS) display, or an electronic paper display. For example, the display 160 may display a variety of content (e.g., text, images, videos, icons, symbols, or the like) to the user. The display 160 may include a touch screen, and may receive a touch input, a gesture input, a proximity input, or a hovering input using electronic pens or a user's body part.

The communication interface 170, for example, may establish communication between the electronic device 10 and external devices (e.g., a first external electronic device 102, a second external electronic device 104, or a server 106). For example, the communication interface 170 may be connected to the network 162 through wireless communication or wired communication in order to thereby communicate with the external devices (e.g., the second external electronic device 104, or the server 106).

For example, the wireless communication may use, as a cellular communication protocol, at least one of LTE (long-term evolution), LTE-A (LTE Advance), CDMA (code division multiple access), WCDMA (wideband CDMA), a UMTS (universal mobile telecommunications system), WiBro (Wireless Broadband), GSM (Global System for Mobile Communications), or the like. In addition, the wireless communication, for example, may include near-field (short-range) communication 164. The near-field (short-range) communication 164, for example, may include at least one of Wi-Fi (wireless fidelity), Bluetooth, NFC (near-field communication), or a GNSS (global navigation satellite system). The GNSS, for example, may include at least one of a GPS (global positioning system), a GLONASS (global navigation satellite system), the Beidou Navigation Satellite System (hereinafter, "Beidou"), Galileo, or the European global satellite-based navigation system according to the usage area or bandwidth. Hereinafter, "GPS" may be used interchangeably with "GNSS" in the present specification. For example, the wired communication may include at least one of a USB (universal serial bus), an HDMI (high-definition multimedia interface), RS-232 (recommended standard 232), or a POTS (plain old telephone service). The network 162 may include at least one of telecommunication networks, such as a computer network (e.g., LAN or WAN), the Internet, or a telephone network.

The first external device 102 and the second external device 104 may be the same as, or different from, the electronic device 10 as to the type thereof. According to an embodiment, the server 106 may include a group of one or more servers. According to various embodiments, at least some, or all, of the operations that are executed in the electronic device 10 may be executed by one or more other electronic devices (e.g., the electronic device 102 or 104, or the server 106). According to an embodiment, in the case where the electronic device 10 executes a specific function or service automatically or upon request, the electronic device 10 may make a request to other devices (e.g., the electronic device 102 or 104, or the server 106) for at least some of the functions related to the function or service additionally, or instead of, executing the same by itself. The other electronic devices (e.g., the electronic device 102 or 104, or the server 106) may execute the requested function or additional function, and may transfer the result thereof to the electronic device 10. The electronic device 10 may provide the requested function or service by providing the result without changing or by additionally processing the same. To this end, for example, cloud computing, distributed computing, or client-server computing technology may be used.

The electronic device 10, which will be described below, may be any one of the aforementioned wearable device, a notebook, a netbook, a smart phone, a tablet PC, a galaxy tab, an iPad, or a wireless charging device. The electronic device may be a smart phone in the present embodiment.

The electronic device 10, according to various embodiments of the present disclosure, may be equipped with a near-field (short-range) communication antenna device for near-field (short-range) communication.

Figure 4A:
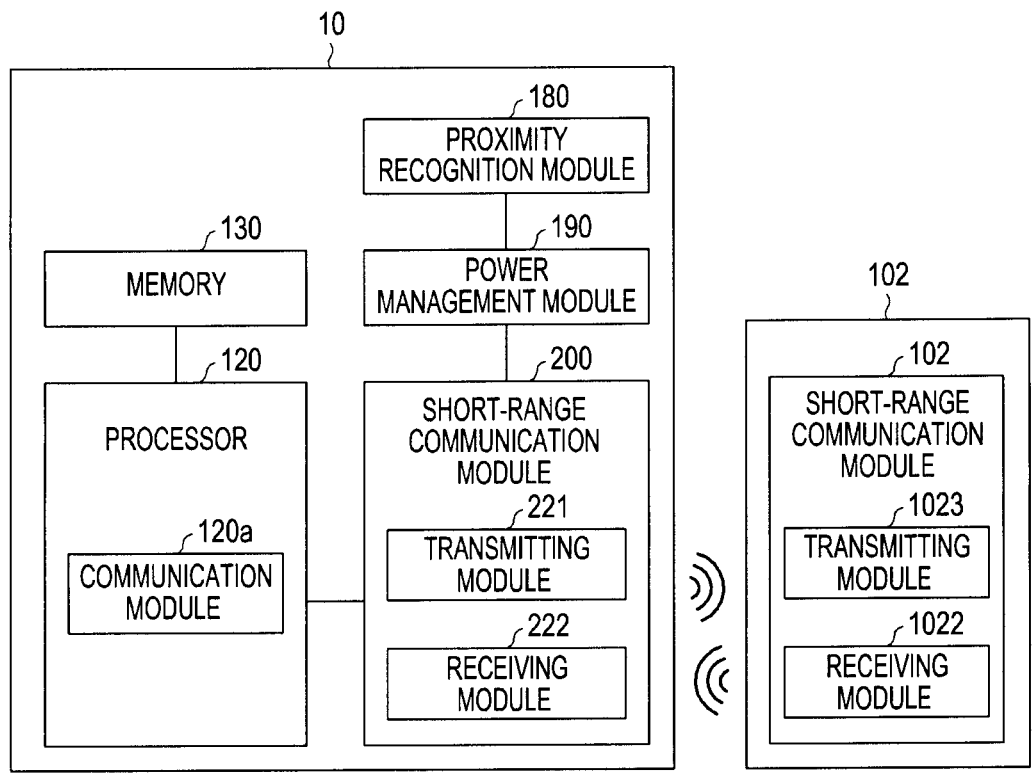
FIG. 4A is a block diagram illustrating an example of a near-field (short-range) communication antenna device included in an electronic device according to various embodiments of the present disclosure.
Figure 4B:
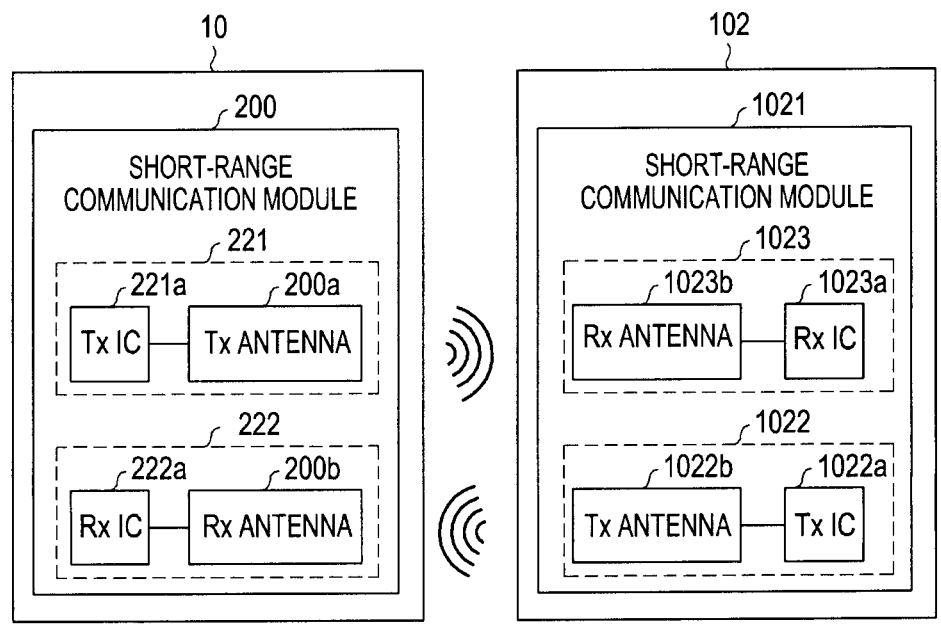
FIG. 4B is a block diagram illustrating the operation state of a near-field (short-range) communication antenna device included in an electronic device according to various embodiments of the present disclosure.

FIG. 4A is a block diagram illustrating an example of a near-field (short-range) communication antenna device included in an electronic device according to various embodiments of the present disclosure. FIG. 4B is a block diagram illustrating the operation state of a near-field (short-range) communication antenna device included in an electronic device according to various embodiments of the present disclosure.

Referring to FIGS. 4A and 4B, the electronic device 10 may be configured to include: a near-field (short-range) communication module 200 including a transmitting module 221 that has a transmitting circuit (Tx IC) 221a and a transmitting antenna (Tx Antenna) 200a and a receiving module 222 that has a receiving circuit (Rx IC) 222a and a receiving antenna (Rx Antenna) 200b, a processor 120 including a communication module 120a, a memory 130, a proximity recognition module 180, and a power management module 190.

The processor 120 may control the overall operations of the electronic device 10, and may perform control for a near-field communication function provided by the electronic device 10. The processor 120 drives an operating system (OS) and respective components. For example, the processor may be a central processing unit (CPU).

In particular, the processor 120, according to various embodiments of the present disclosure, may control activation or deactivation of a near-field communication function of a near-field communication module 120 depending on connection with the near-field communication module 1021 of the external electronic device 102. That is, the processor 120 activates the near-field communication module 120 while it is connected with the near-field communication module of the external electronic device 102 and deactivates the near-field communication module 200 when it is disconnected from the near-field communication module 1021 of the external electronic device 102 (that is, when it is in the disconnected state). This may be performed by operations in which the processor 120 transmits activation/deactivation configuration information for a near-field communication function to the near-field communication module 200 and the near-field communication module 200 receives and stores the activation/deactivation configuration information and performs or releases a communication function according to the stored configuration information.

That is, the processor 120 may activate/deactivate a near-field communication function of the near-field communication module 200 according to power-on/off of the electronic device 10. For example, the processor 120 may transmit deactivation configuration information to the near-field communication module 200, thereby converting the near-field communication module 200 into the deactivated state. When the near-field communication module 200 is converted into the deactivated state according to the configuration information, the near-field communication module 200 does not perform near-field communication function.

In addition, the processor 120 transmits activation configuration information to the near-field communication module 200, thereby converting the near-field communication module 200 into the activated state. When the near-field communication module 200 is converted into the activated state according to the configuration information, the near-field communication module 200 is able to perform near-field communication function.

The communication module 120a provided in the processor 120 may perform data communication through a wireless communication network. The communication module 120a may transmit and receive data using one or more communication schemes. To this end, the communication module may include a plurality of communication modules for transmitting and receiving data according to different communication schemes.

The memory 130 may store information necessary for the operation of a portable terminal according to an embodiment of the present disclosure, and may store a variety of data for a near-field communication function.

The memory 130 may include a magnetic media, such as hard disks, floppy disks, and magnetic tapes, optical media, such as compact disk read only memories (CDROMs) and digital video disks (DVDs), magneto-optical media such as floppy disks, a ROM, a random access memory (RAM), and a flash memory.

According to various embodiments of the present disclosure, the near-field communication module 200 may perform a near-field communication function under the control of the processor 120, and may activate or deactivate the near-field communication function under the control of the processor 120.

For example, the processor 120 may activate the near-field communication module 200 when the electronic device 10 is turned on. When the approach of the external electronic device 102 is detected by the proximity recognition module 180, the proximity recognition module 180 may operate the near-field communication module 200.

The proximity recognition module 180 may be configured by any one of a hall sensor, an illuminance sensor, or a proximity sensor.

When the approach of the external electronic device 102 to the electronic device 10 is detected by the proximity recognition module 180, the power management module 190 may supply power to the near-field communication module 200 to thus operate the same.

As shown in FIG. 4B, the near-field communication module 200 is operated by the proximity recognition module 180, and the near-field communication module 200 may transmit/receive data to/from a transmitting module 1022 and a receiving module 1023 of the near-field communication module 1021 provided in the external electronic device 102 by means of the transmitting circuit (Tx IC) 221*a* and the transmitting antenna (Tx Antenna) 200*a* of the transmitting module 221 and the receiving circuit (Rx IC) 222*a* and a receiving antenna (Rx Antenna) 200*b* of the receiving module.

More specifically, the near-field (short-range) communication antenna device 200 has a wireless communication distance of only a few tens of millimeters (mm) between wireless portable electronic devices 10 because it has a high propagation loss per unit distance at a high frequency for high-speed data communication. Therefore, the near-field (short-range) communication antenna devices 200 must maintain an appropriate proximity distance between each other in order to perform effective transmission/reception. This feature enables transmission and reception of the electronic device 10 and the external electronic device 102 located within the proximity distance and reduces the possibility of interference with a distant external electronic device 102 located beyond the proximity distance.

Figure 5:
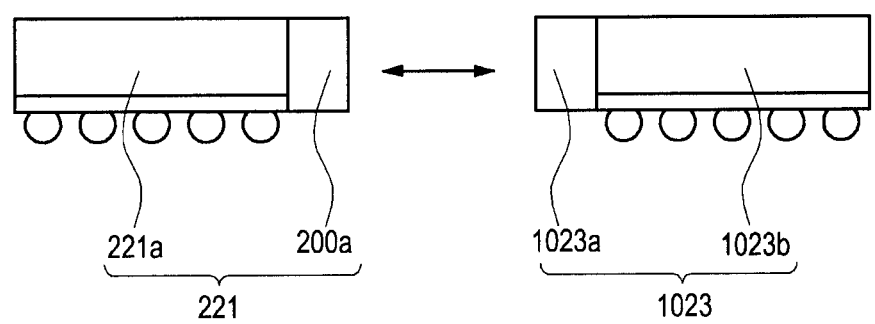
FIG. 5 is a diagram illustrating a transmitting module and a receiving module in the configuration of a near-field (short-range) communication antenna device included in an electronic device according to various embodiments of the present disclosure.

FIG. 5 is a diagram illustrating a transmitting module and a receiving module in the configuration of a near-field (short-range) communication antenna device included in an electronic device according to various embodiments of the present disclosure. For example, as shown in FIGS. 4B and 5, a transmitting module 221 of the electronic device 10 may include a transmitting circuit 221*a* (Tx IC) and a transmitting antenna (Tx Antenna) 200*a*, which are integrally provided therein, and a receiving module 222 of the electronic device 10 may include a receiving circuit 222*a* (Rx IC) and a receiving antenna (Rx antenna) 200*b*, which are integrally provided therein.

In addition, a transmitting module 1022 of the external electronic device 102 may include a transmitting circuit 1022*a* (Tx IC) and a transmitting antenna (Tx Antenna) 1022*b*, which are integrally provided therein, and a receiving module 1023 of the external electronic device 102 may include a receiving circuit 1023*a* (Rx IC) and a receiving antenna (Rx Antenna) 1023*b* which are integrally provided therein.

Figure 6:
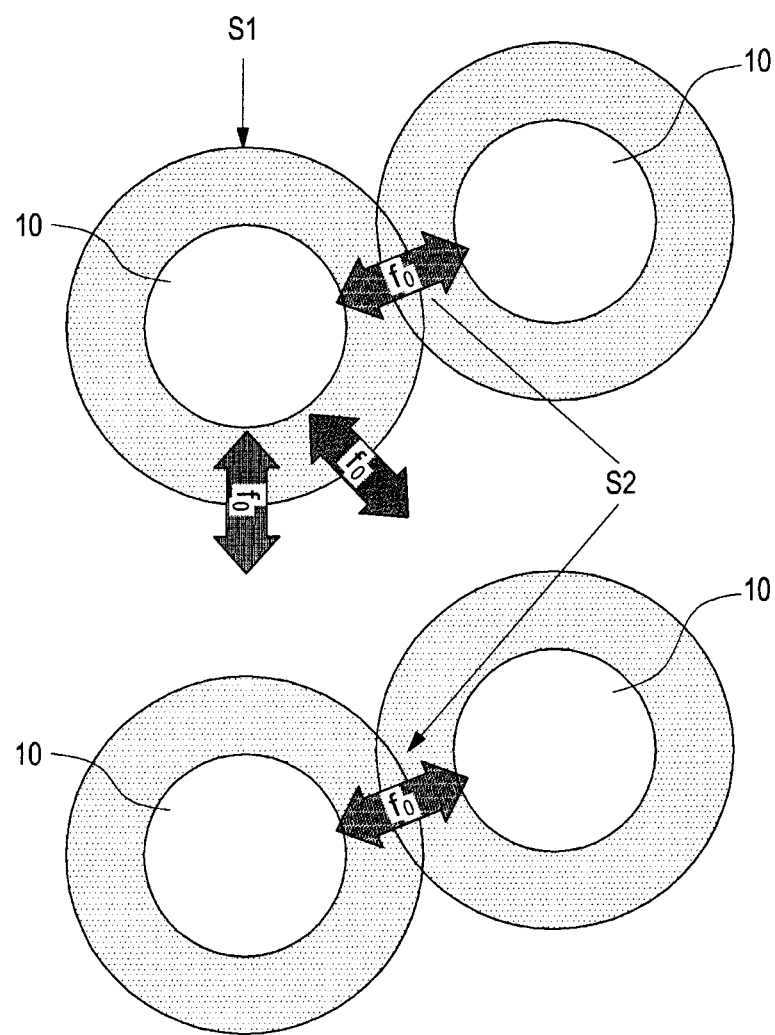
FIG. 6 is a diagram illustrating a transmitting/receiving link of a near-field (short-range) communication antenna device included in an electronic device using a frequency channel for short-range communication according to various embodiments of the present disclosure.

As shown in FIG. 6, the electronic devices 10 have a short-range communication radio wave propagation range S1 defined by propagation loss, and thus a frequency link S2 may be formed only when the electronic devices 10 are sufficiently close to each other. In the case where a group of electronic devices 10 forming a frequency link S2 is located near another group of electronic devices 10 forming a frequency link S2, if the two groups are spaced far enough apart to ignore interference therebetween, the frequency links S2 may be the same frequency channel (fo) for near-field (short-range) communication. The electronic devices 10 may ensure improved frequency reusability in the manner described above, thereby forming a plurality of transmission/reception links S2 using the same frequency channel (fo) for near-field (short-range) communication in a limited space.

Hereinafter, the electronic device 10 adopting the near-field (short-range) communication antenna device 200, according to various embodiments, will be described in more detail with reference to the accompanying drawings.

Figure 7:
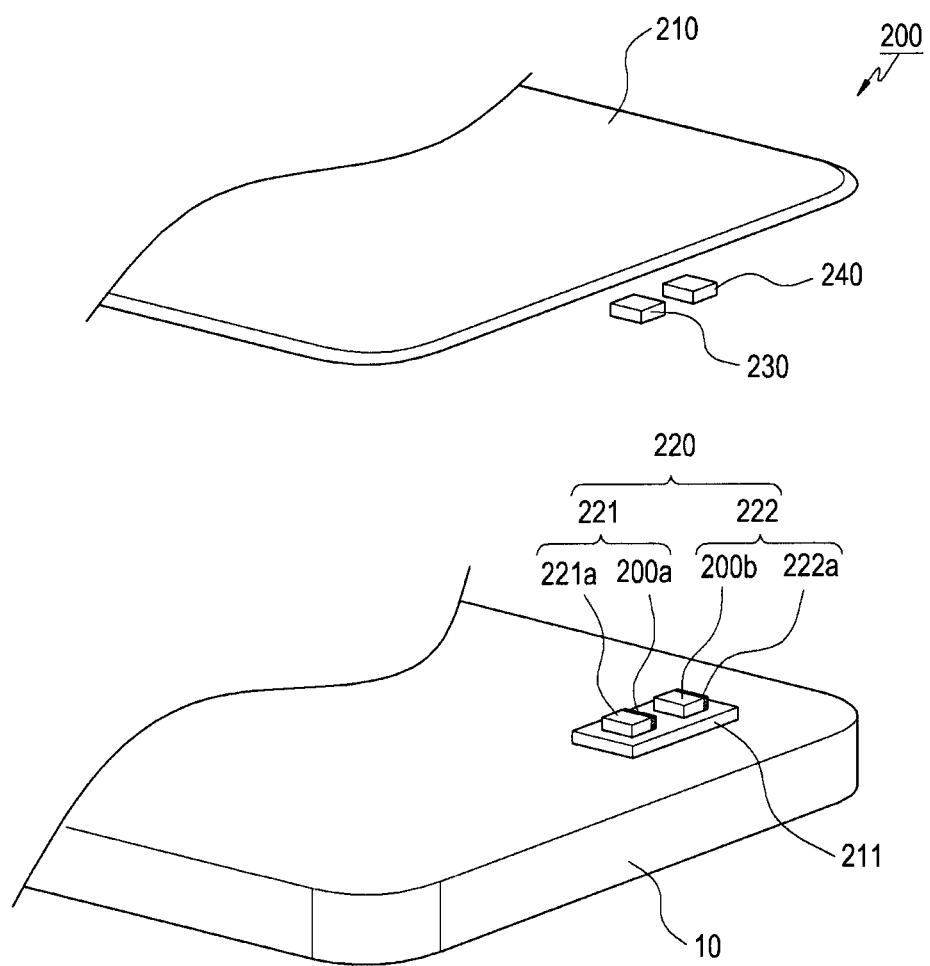
FIG. 7 is a perspective view illustrating a configuration example of a near-field (short-range) communication antenna device provided in an electronic device according to various embodiments of the present disclosure.
Figure 8:
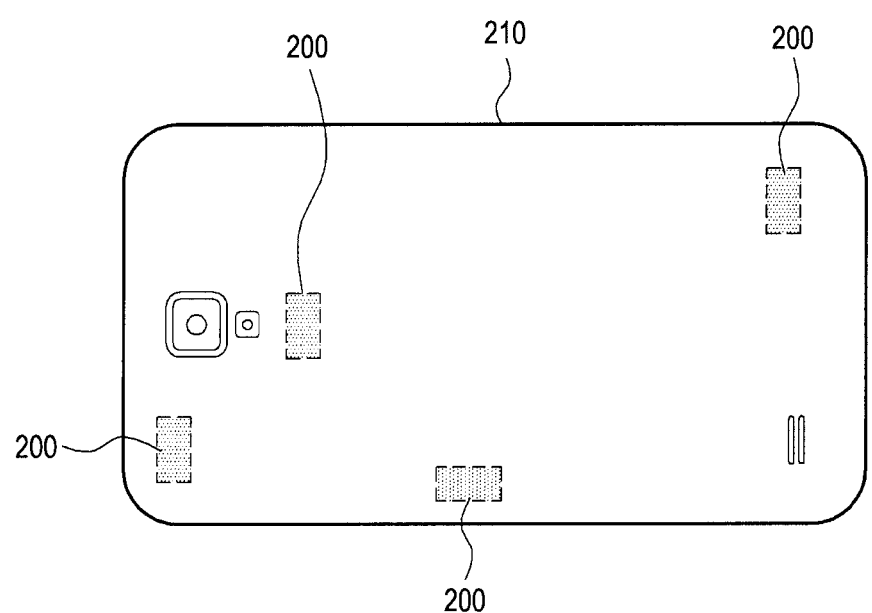
FIG. 8 is a plan view illustrating the position of a near-field (short-range) communication antenna device provided in an electronic device according to various embodiments of the present disclosure.

FIG. 7 is a perspective view illustrating a configuration example of a near-field (short-range) communication antenna device 200 provided in an electronic device according to various embodiments of the present disclosure. FIG. 8 is a plan view illustrating the position of a near-field (short-range) communication antenna device 200 provided in an electronic device 10 according to various embodiments of the present disclosure.

Referring to FIGS. 7 and 8, according to various embodiments, the electronic device 10 (see FIGS. 4A and 4B) may be a first electronic device and the external electronic device 102 (see FIGS. 4A and 4B) may be a second electronic device. Hereinafter, the electronic device 10 will be referred to as a first electronic device, and the external electronic device 102 will be referred to as a second electronic device.

The near-field (short-range) communication antenna device 200 used in the first and second electronic device 10 and 102 may include a cover unit 210 of the first electronic device 10, a cover unit 210*a* of the second electronic device 102, a circuit board 211, a near-field (short-range) communication module 220, and first and second dielectric bodies 230 and 240.

For example, the near-field (short-range) communication module 220 may be configured to include the transmitting module 221 that has the transmitting circuit 221*a* (Tx IC) and the transmitting antenna (Tx Antenna) 200*a* (shown in FIG. 4B) and the receiving module 222 that has the receiving circuit 222*a* (Rx IC) and the receiving antenna (Rx Antenna) 200*b* (shown in FIG. 4B), and the transmitting module 221 and the receiving module 222 may be mounted on the circuit board 211 so as to face the first and second dielectric bodies 230 and 240.

The cover unit 210 of the first electronic device 10 may include the first and second dielectric bodies 230 and 240 integrally provided therein, which will be described later.

That is, the first and second dielectric bodies 230 and 240 may be integrally formed on the inner surface of the cover unit 210 of the first electronic device 10.

The circuit board 211 may be provided inside the cover unit 210 so as to have a near-field (short-range) communication module 220 mounted thereon, which will be described later.

For example, the circuit board 211 may be separately configured for mounting the near-field communication module 220 thereon, or the circuit board 211 may be formed of at least a part of a main circuit board (not shown) provided inside the first electronic device 10, instead of being configured separately, such that the near-field (short-range) communication module 220 is mounted on the part.

The first and second dielectric bodies 230 and 240 protrude a predetermined length from the inner surface of the cover unit 210 to face the transmitting module 221 and the receiving module 222.

Here, the cover unit 210 may be configured by any one of a battery cover, a window, a touch panel front case, and a rear case. The cover unit 210 may have other configurations in addition to those described above. In the present embodiment, the cover unit 210 will be described as an example of a battery cover.

As shown in FIG. 8, the first and second dielectric bodies 230 and 240 may be mounted at any positions on the inner surface of the cover unit 210 according to usage.

Since the first and second dielectric bodies 230 and 240 are configured to be directly connected to the transmitting and receiving modules 221 and 222 of the near-field (short-range) communication module 220, it is possible to use and maintain an excellent channel frequency without radio interference between the electronic devices in a limited space and to prevent the directions of antenna radiation patterns of the products from mismatching each other, thereby improving the transmission and reception efficiency of near-field (short-range) communication.

The first and second dielectric bodies 230 and 240 may act as waveguides for transmitting radio signals of the transmitting module 221 and the receiving module 222. For example, the first and second dielectric bodies 230 and 240 may serve as transmission paths for transmitting electrical energy or signals having a high frequency (e.g., 60 GHz) above a microwave. The transmission path may be referred to as a waveguide. The waveguide may allow electromagnetic waves to pass through a tube made of an electric conductor. Since the waveguide confines and transmits radio waves, current does not flow directly to the surrounding conductors so that the resistance loss is small. In addition, since the waveguide usually has a hollow filled with air, the dielectric loss is small as well.

The first and second dielectric bodies 230 and 240 may have a cross section of any one of a rectangle, a square, a cylinder, a cone, a pyramid, or a triangular pyramid. The first and second dielectric bodies may have other shapes, instead of the shapes described above.

The first dielectric body 230 integrally provided in the cover unit 210 and 210a of the first and second electronic devices 10 and 102 may face the transmitting module 221, and the second dielectric body 240 integrally provided in the cover units 210 and 210a of the first and second electronic devices 10 and 102 may face the receiving module 222.

Figure 9:
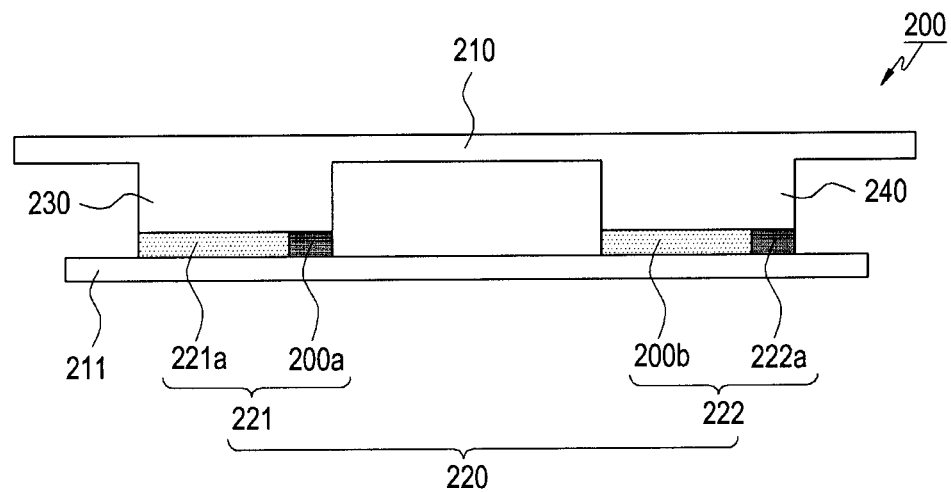
FIG. 9 is a side sectional view illustrating the coupled state of a near-field (short-range) communication antenna device provided in an electronic device according to various embodiments of the present disclosure.
Figure 10:
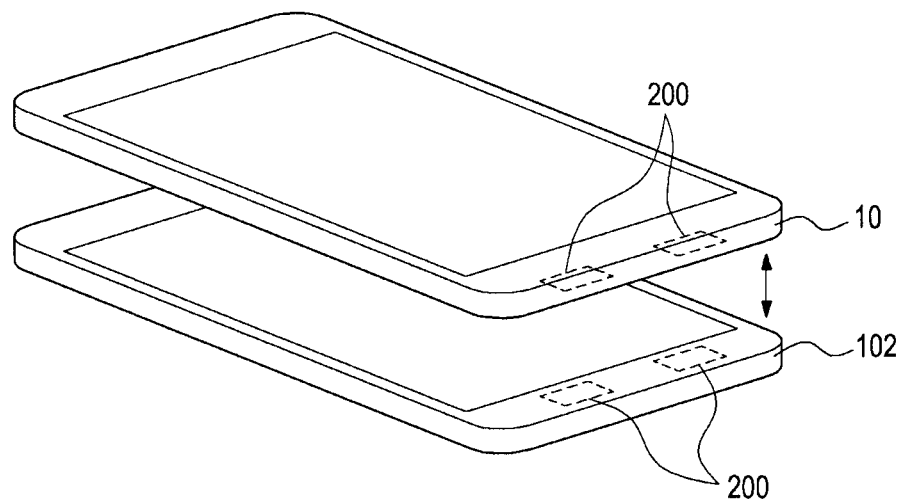
FIG. 10 is a perspective view illustrating the usage state of a near-field (short-range) communication antenna device provided in an electronic device according to various embodiments of the present disclosure.

In this state, as shown in FIGS. 9 and 10, when the first and second electronic devices 10 and 102 approach each other for near-field (short-range) communication, the first dielectric body 230 provided in the transmitting module 221 of the first electronic device 10 may face the second dielectric body 240 provided in the receiving module 222 of the second electronic device 102, while the second dielectric body 240 provided in the receiving module 222 of the first electronic device 10 faces the first dielectric body 230 provided in the transmitting module 221 of the second electronic device.

Figure 11:
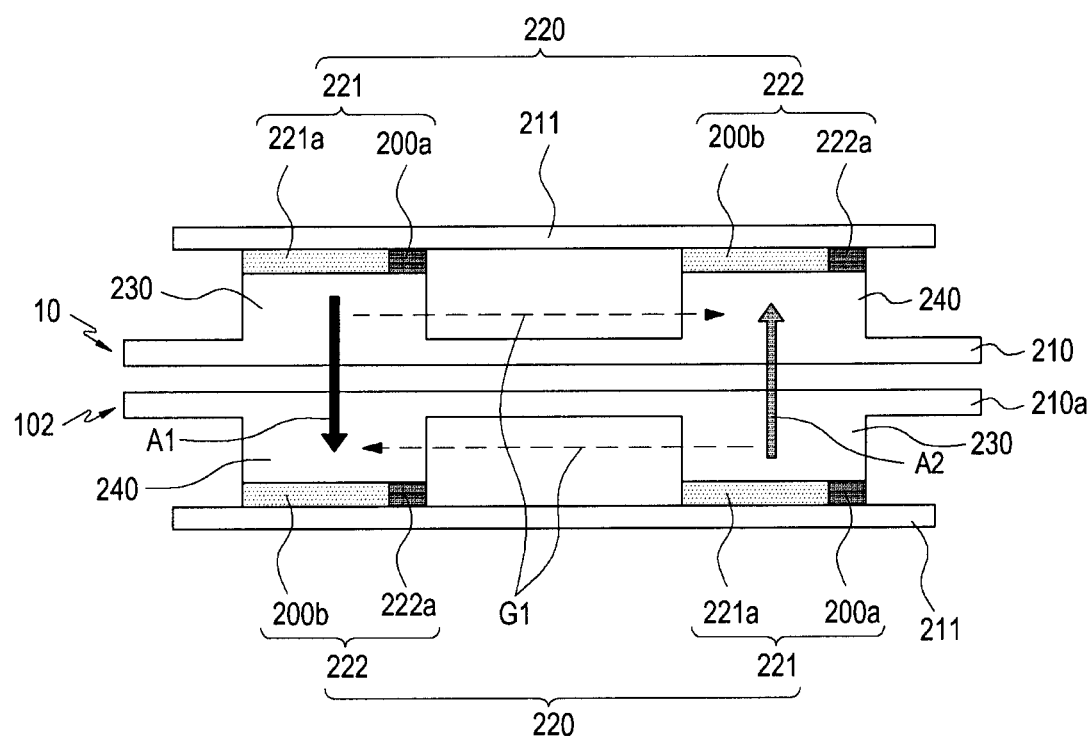
FIG. 11 is a side sectional view illustrating the usage state of a near-field (short-range) communication antenna device provided in an electronic device according to various embodiments of the present disclosure.

FIG. 11 is a view illustrating transfer paths of radio signals of a near-field (short-range) communication antenna device 200 according to various embodiments of the present disclosure.

Referring to FIG. 11, for example, the near-field (short-range) communication module 220 may include a transmitting module 221 and a receiving module 222, wherein the transmitting module 221 includes a transmitting circuit (Tx IC) 221a and a transmitting antenna (Tx Antenna) 200a for transmitting radio signals and the receiving module 222 includes a receiving circuit 222a (Rx IC) and a receiving antenna (Rx Antenna) 200b (shown in FIG. 4B) for receiving radio signals.

In this state, when the transmitting module 221 of the cover unit 210 of the first electronic device 10 transmits a radio signal, the radio signal is transferred to the second dielectric body 240 provided in the receiving module 222 of the cover unit 210a of the second electronic device 102 through the first dielectric body 230 provided in the transmitting module 221 of the cover unit 210 of the first electronic device 10, and then the second dielectric body 240 transfers the transmitted radio signal (A1) to the receiving module 222.

In addition, when the transmitting module 221 of the cover unit 210 of the second electronic device 102 transmits a radio signal (A2), the radio signal is transferred to the second dielectric body 240 provided in the receiving module 222 of the cover unit 210 of the first electronic device 10 through the first dielectric body 230 provided in the transmitting module 221 of the cover unit 210a of the second electronic device, and then the second dielectric body 240 transfers the transmitted radio signal (A2) to the receiving module 222 of the cover unit 210 of the first electronic device 10.

The radio signals (A1 and A2) transmitted from the transmitting modules 221 of the cover units 210 and 210a of the first and second electronic devices 10 and 102 are transferred to the receiving modules 222 of the cover units 210 and 210a of the first and second electronic devices via the first and second dielectric bodies 230 and 240.

In addition, the first and second dielectric bodies 230 and 240 of the first and second electronic devices 10 and 102 may be configured to have different relative-dielectric constants from each other in order to minimize the inter-channel frequency interference (G1).

For example, as shown in FIG. 11, the first and second dielectric bodies 230 and 240 of the cover unit 210 provided in the first electronic device 10 may be configured to have different relative-dielectric constants from each other, and the first and second dielectric bodies 230 and 240 of the cover unit 210a provided in the second electronic device 102 may be configured to have different relative-dielectric constants from each other. More specifically, a path is shown, through which the radio signal (A1) transmitted from the transmitting module 221 of the cover unit 210 of the first electronic device 10 is effectively transferred to the receiving module 222 of the cover unit 210a of the second electronic device 102. Another path is shown, through which the radio signal (A2) transmitted from the transmitting module 221 of the cover unit 210a of the second electronic device 102 is effectively transferred to the receiving module 222 of the cover unit 210 of the first electronic device 10. In this state, since the first and second dielectric bodies 230 and 240 are configured to have different relative-dielectric constants from each other, it is possible to reduce the channel interference (G2) applied from the transmitting module 221 of the cover unit 210 of the first electronic device 10 to the receiving module 222 and to reduce the channel interference (G2) applied from the transmitting module 221 of the cover unit 210a of the second electronic device 102 to the receiving module 222. Accordingly, radio signals between the transmitting module and the receiving module are concentrated inside the first and second dielectric bodies, thereby reducing the channel interference (G2) applied from the transmitting module to the receiving module.

Figure 12:
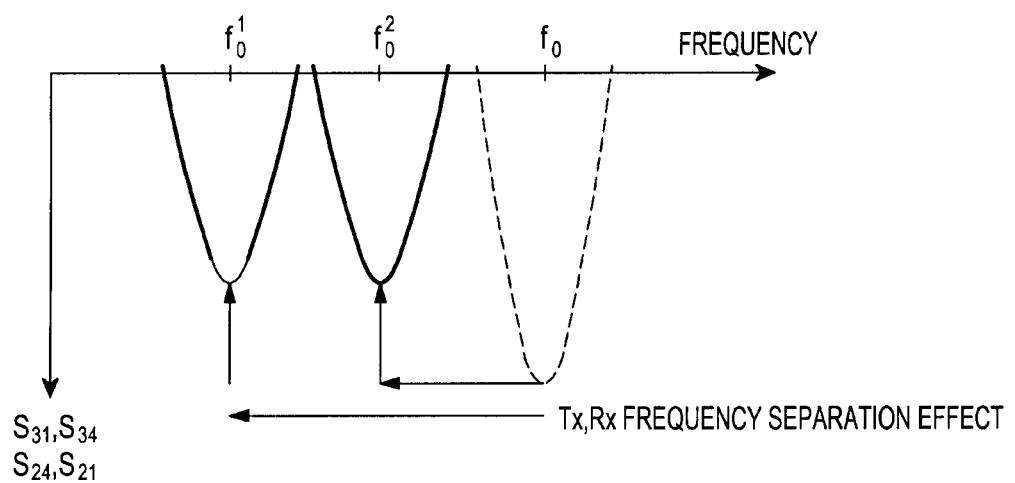
FIG. 12 is a graph showing a result of application of first and second dielectric bodies having different relative-dielectric constants according to various embodiments of the present disclosure.
Figure 13:
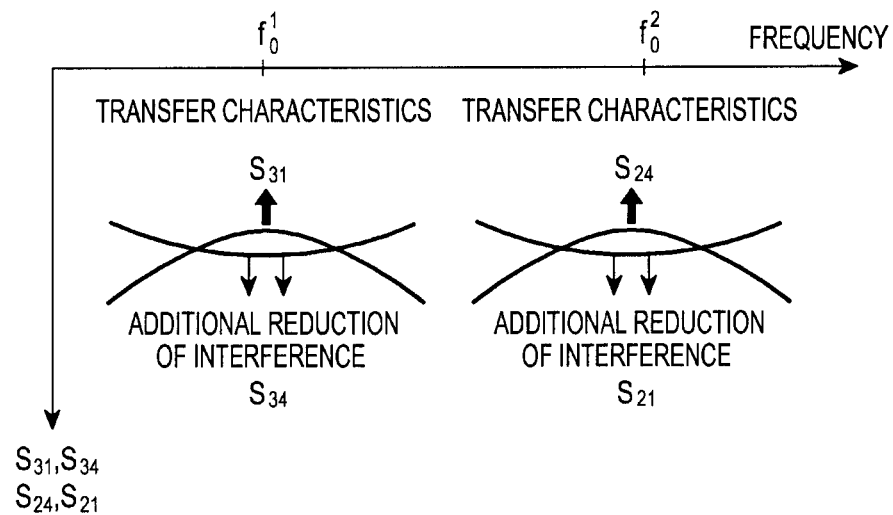
FIG. 13 is a graph showing the inter-channel frequency interference of first and second dielectric bodies according to various embodiments of the present disclosure.

FIG. 12 is a graph showing the result of application of first and second dielectric bodies 230 and 240 having different relative-dielectric constants according to various embodiments of the present disclosure. FIG. 13 is a graph showing the inter-channel frequency interference of first and second dielectric bodies 230 and 240 according to various embodiments of the present disclosure.

As shown in FIG. 12, when the first and second dielectric bodies 230 and 240 are provided in the first and second electronic devices 10 and 102, a difference between the respective down-transitioned channel frequencies occurs, so that the reception ratio of an interference signal can be reduced because of the frequency difference.

For example, as shown in FIGS. 12 and 13, two different channel frequencies resulting from the difference between the relative-dielectric constants are $f_o^1$ and $f_o^2$, respectively, and S31, S34, S24 and S21 are input-reflection coefficients of the transmitting module 221 and the receiving module 222. The channel frequency of the transmitting module 221 and the channel frequency of the receiving module 222 are separated, thereby reducing the inter-channel frequency interference. That is, a channel frequency separation effect can be obtained.

Figure 14:
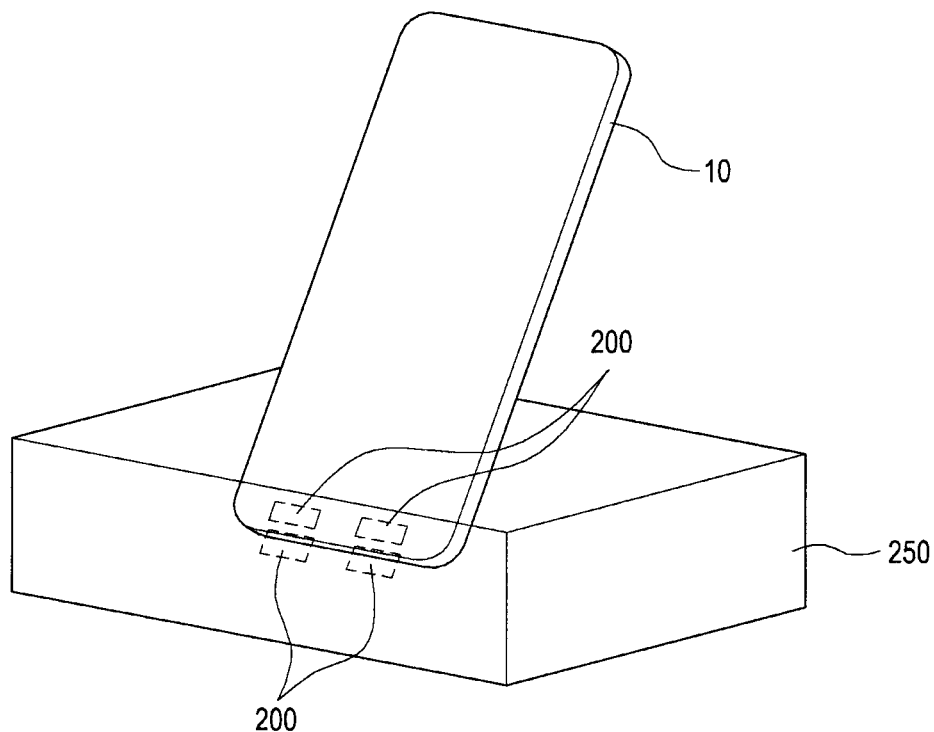
FIG. 14 is a perspective view showing the usage state in which a near-field (short-range) communication antenna device is placed on a cradle according to various embodiments of the present disclosure.

FIG. 14 is a perspective view showing the usage state in which a near-field (short-range) communication antenna device 200 is placed on a cradle 250 according to various embodiments of the present disclosure.

As shown in FIG. 14, the electronic device 10 may be configured by the first and second electronic devices 10 and 102, wherein the first electronic device 10 may be a portable communication device 10 and the second electronic device 102 may be a cradle 250.

The first dielectric body 230 integrally provided in the cover unit 210 of the portable communication device 10 may face the transmitting module 221 of the near-field (short-range) communication module 220, and the second dielectric body 240 integrally provided in the cover unit 210 of the portable communication device 10 may face the receiving module 222 of the near-field (short-range) communication module 220.

The first dielectric body 230 integrally provided in the cover unit 210 of the cradle 250 may face the transmitting module 221 of the near-field (short-range) communication module 220, and the second dielectric body 240 integrally provided in the cover unit 210 of the cradle 250 may face the receiving module 222 of the near-field (short-range) communication module 220.

In this state, when the portable communication device 10 is placed on the cradle 250 as shown in FIG. 14, the first dielectric body 230 provided in the transmitting module 221 of the portable communication device 10 may face the second dielectric body 240 provided in the receiving module 222 of the cradle 250 while the second dielectric body 240 provided in the receiving module 222 of the portable communication device 10 faces the first dielectric body 230 provided in the transmitting module 221 of the cradle 250.

Accordingly, the portable communication device 10 and the cradle 250 may perform near-field (short-range) wireless communication and wireless power transmission, thereby transmitting and receiving a variety of data and performing wireless charging of a battery pack (not shown) provided in the portable communication device 10.

According to various embodiments of the present disclosure, as described in FIG. 7, a near-field (short-range) communication antenna device 200 used in an electronic device may include: a cover unit 210 of a first electronic device 10; a circuit board 211 configured to be provided inside the cover unit; a near-field (short-range) communication module 220 configured to include a transmitting module 221 and a receiving module 222, which are mounted on the circuit board; and first and second dielectric bodies 230 and 240 configured to be provided between the cover unit and the near-field (short-range) communication module and configured to protrude a predetermined length from the cover unit so as to face the transmitting module and the receiving module.

According to various embodiments of the present disclosure, the cover unit may be configured by any one of a battery cover, a window, a touch panel, a front case, and a rear case.

According to various embodiments of the present disclosure, the first and second dielectric bodies may act as waveguides for transmitting radio signals of the transmitting module and the receiving module.

According to various embodiments of the present disclosure, the first and second dielectric bodies may act as gaskets for transmitting radio signals of the transmitting module and the receiving module.

According to various embodiments of the present disclosure, the waveguide may have the shape of any one of a rectangle, a square, a cylinder, a cone, a pyramid, or a triangular pyramid.

According to various embodiments of the present disclosure, the first and second dielectric bodies may be integrally provided on the inner surface of the cover unit.

According to various embodiments of the present disclosure, the electronic device may include first and second electronic devices, wherein the first dielectric body integrally provided in the cover unit of the first or second electronic device 10 and 102 faces the transmitting module and the second dielectric body integrally provided in the cover unit of the first or second electronic device 10 and 102 faces the receiving module, and wherein when the first and second electronic devices 10 and 102 approach each other for near-field (short-range) communication, the first dielectric body provided in the transmitting module of the first electronic device 10 faces the second dielectric body provided in the receiving module of the second electronic device and the second dielectric body provided in the receiving module of the first electronic device faces the first dielectric body provided in the transmitting module of the second electronic device 102.

According to various embodiments of the present disclosure, the first and second dielectric bodies may have different relative-dielectric constants in order to separate channel frequencies thereof. More specifically, the first and second dielectric bodies provided in the cover unit of the first electronic device may have different relative-dielectric constants, and the first and second dielectric bodies provided in the cover unit of the second electronic device may have different relative-dielectric constants.

Hereinafter, an electronic device 10 adopting a near-field (short-range) communication antenna device 300, according to various other embodiments, will be described with reference to the accompanying drawings.

The overall operation of the near-field (short-range) communication antenna device included in the electronic device has been described above in the various embodiments of the present disclosure with reference to FIGS. 4A, 4B, and 6, and thus a description thereof will be omitted below.

Figure 15:
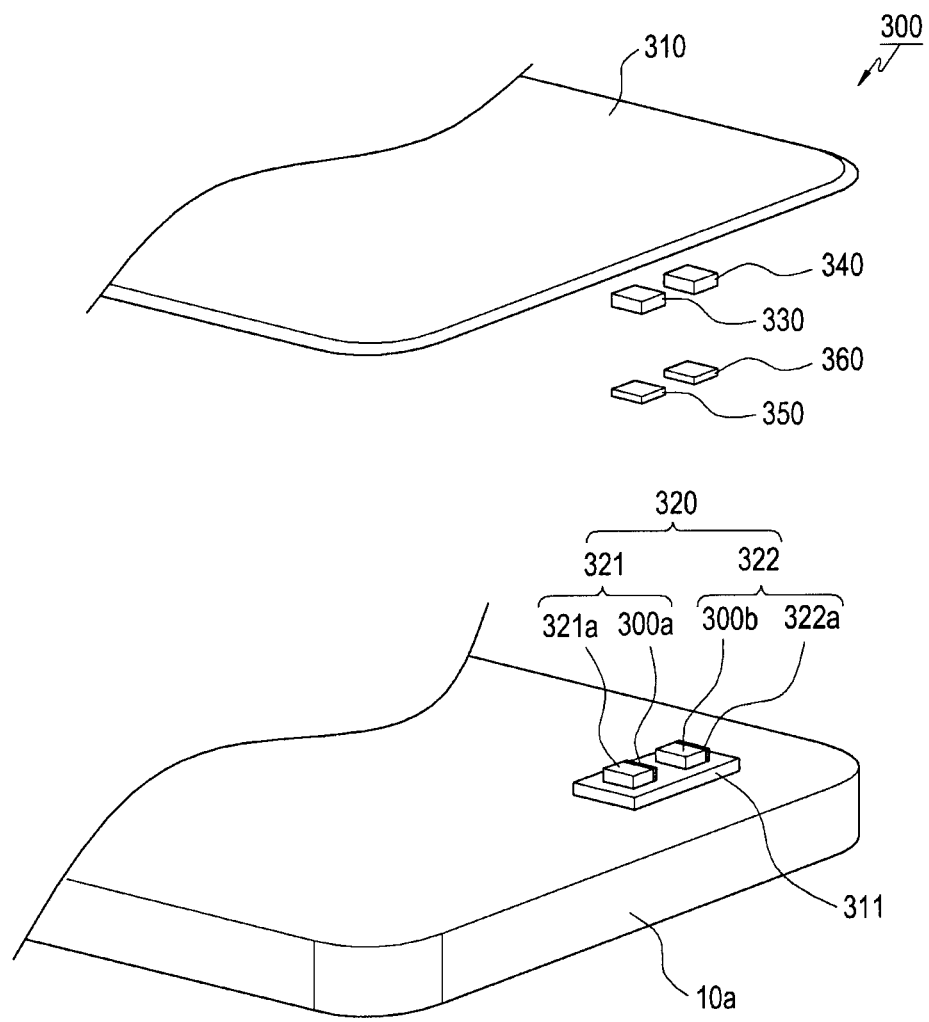
FIG. 15 is a perspective view illustrating a configuration example of a near-field (short-range) communication antenna device provided in an electronic device according to various other embodiments of the present disclosure.
Figure 16:
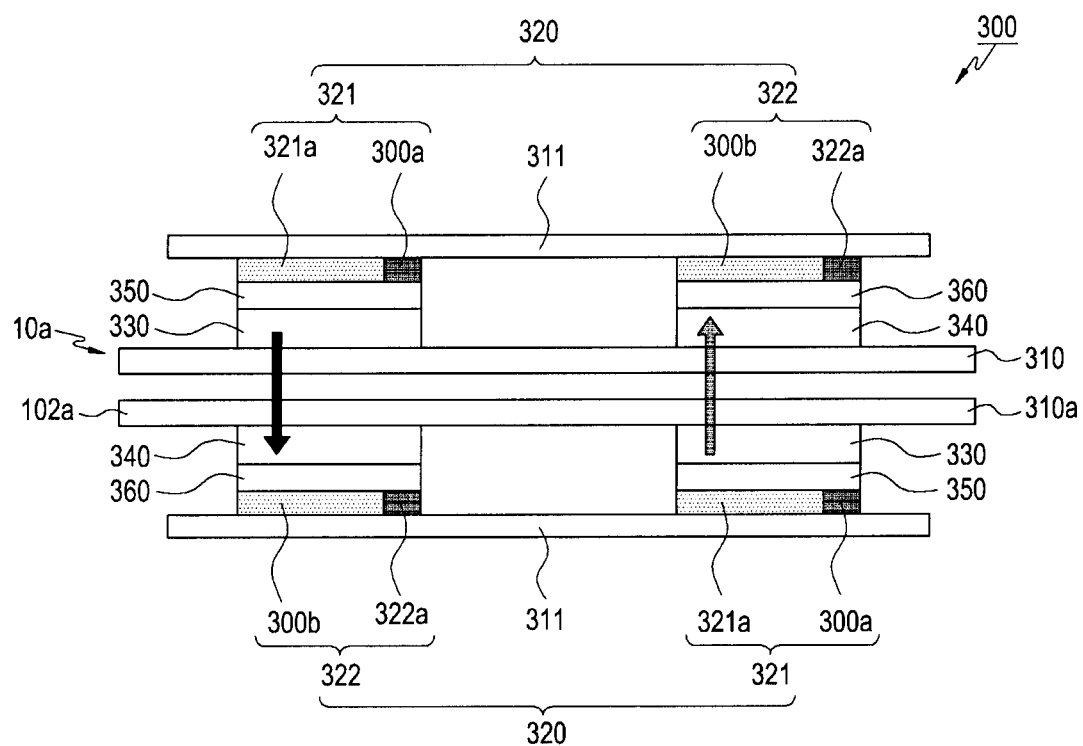
FIG. 16 is a side sectional view illustrating the usage state of a near-field (short-range) communication antenna device provided in an electronic device according to various other embodiments of the present disclosure.

FIG. 15 is a perspective view illustrating a configuration example of a near-field (short-range) communication antenna device 300 provided in an electronic device according to various other embodiments of the present disclosure, and FIG. 16 is a side sectional view illustrating the usage state of a near-field (short-range) communication antenna device 300 provided in an electronic device according to various other embodiments of the present disclosure.

Referring to FIGS. 15 and 16, according to various embodiments, the electronic device 10a may be a first electronic device and the external electronic device 102a may be a second electronic device. Hereinafter, the electronic device 10a will be referred to as a first electronic device, and the external electronic device 102a will be referred to as a second electronic device.

For example, the near-field (short-range) communication antenna device 300 used in the first and second electronic device 10a and 102a may include a cover unit 310 of the first electronic device 10a, a cover unit 310a of the second electronic device 102a, a circuit board 311, a near-field (short-range) communication module 320 including a transmitting module 321 and a receiving module 322, and first, second, third, and fourth dielectric bodies 330, 340, 350, and 360.

For example, the near-field (short-range) communication module 320 may be configured to include a transmitting module 321 that has a transmitting circuit 321a (Tx IC) and a transmitting antenna (Tx Antenna) 300a and a receiving module 322 that has a receiving circuit 322a (Rx IC) and a receiving antenna (Rx Antenna) 300b.

The circuit board 311 may be provided inside the cover unit so as to mount the near-field (short-range) communication module 320 thereon, which will be described later.

The cover unit 310 of the electronic device may include the first and second dielectric bodies 330 and 340 integrally provided therein, which will be described later.

That is, the first and second dielectric bodies 330 and 340 may be integrally provided on the inner surface of the electronic device cover unit 310.

The third dielectric body 350 may be provided between the transmitting module 321 and the first dielectric body 330 so as to improve transfer the characteristics of a radio transmission signal.

The fourth dielectric body 360 may be provided between the receiving module 322 and the second dielectric body 340 to improve the transfer characteristics of a radio reception signal.

A first surface of the third dielectric body 350 may face the first dielectric body 330, and a second surface opposite the first surface of the third dielectric body 350 may face the transmitting module 321.

A first surface of the fourth dielectric body 360 may face the second dielectric body 340, and a second surface opposite the first surface of the fourth dielectric body may face the receiving module 322.

As described above, since the first surfaces of the third and fourth dielectric bodies 350 and 360 face the first and second dielectric bodies 330 and 340 and the second surfaces opposite the first surfaces are directly connected to the transmitting module and receiving module 321 or 322 of the near-field (short-range) communication module 320, it is possible to improve the transfer characteristics of transmission/reception signals of the near-field (short-range) communication module 320 and to use and maintain an excellent channel frequency without radio interference between the electronic devices in a limited space.

For example, the third and fourth dielectric body 350 and 360 may be interposed between the first dielectric body 330 and the transmitting module 321 and between the second dielectric body 340 and the receiving module 322, and the third and fourth dielectric bodies 350 and 360 may have matching dielectric body sections. The matching dielectric body section may be a section having a relative-dielectric constant lower than those of the first and second dielectric bodies 330 and 340, or may be a section having a relative-dielectric constant the same as that of air. In addition, since the third and fourth dielectric bodies 350 and 360 relatively mitigate the mismatch of the antenna feeding impedance of the near-field (short-range) communication module 320 by adopting the third and fourth dielectric bodies 350 and 360 provided in the cover units 310 and 310a of the first and second electronic devices, the matching between each of the transmitting module 321 and the receiving module 322 and the first and second dielectric bodies 330 and 340 can be improved, thereby lowering input-reflection coefficients of the transmitting module 321 and the receiving module 322, respectively, and improving the transfer efficiency of each channel frequency.

The first and second dielectric bodies 330 and 340 may act as waveguides for transmitting radio signals of the transmitting module and the receiving module, and the third and fourth dielectric bodies 350 and 360 may act as gaskets for transmitting radio signals of the transmitting module and the receiving module.

As described above, the third and fourth dielectric bodies 350 and 360 may have relative-dielectric constants lower than those of the first and second dielectric bodies 330 and 340 or may have relative-dielectric constants the same as that of air in order to improve the transfer characteristics of transmission and reception signals of the near-field (short-range) communication module 320.

First surfaces of the third and fourth dielectric bodies 350 and 360 provided in the first electronic device 10a may face the first and second dielectric bodies 330 and 340 integrally provided in the cover unit 310 of the first electronic device 10a, and second surfaces opposite the first surfaces of the third and fourth dielectric bodies 350 and 360 may face the transmitting module 321 and the receiving module 322 provided in the first electronic device 10a.

First surfaces of the third and fourth dielectric bodies 350 and 360 provided in the second electronic device 102a may face the first and second dielectric bodies 330 and 340 integrally provided in the cover unit 310a of the second electronic device 102a, and second surfaces opposite the first surfaces of the third and fourth dielectric bodies 350 and 360 may come into contact with the transmitting module 321 and the receiving module 322 provided in the second electronic device 102a.

FIG. 16 described above is a diagram showing transfer paths of radio signals of the near-field (short-range) communication antenna device 300 according to various embodiments of the present disclosure.

Referring to FIG. 16, when the transmitting module 321 of the first electronic device 10a transmits a radio signal, the radio signal is transferred to the first dielectric body 330 through the third dielectric body 350 provided in the transmitting module 321 of the first electronic device 10a, the radio signal transferred to the first dielectric body 330 is transferred to the second dielectric body 340 provided in the second electronic device, the second dielectric body 340 transfers the radio signal to the fourth dielectric body 360, and the fourth dielectric body 360 transfers the transmitted radio signal to the receiving module 322.

For example, the radio signals from the transmitting module 321 to the receiving module 322 may be concentrated through the inside of the first, second, third, and fourth dielectric bodies 330, 340, 350, and 360, thereby reducing the inter-channel frequency interference applied to the transmitting module 321 to the receiving module 322.

In addition, when the transmitting module 321 of the second electronic device 102a transmits a radio signal, the radio signal is transferred to the first dielectric body 330 of the second electronic device through the third dielectric body 350 provided in the transmitting module 321 of the second electronic device 102a, the first dielectric body 330 transfers the radio signal to the second dielectric body 340 provided in the first electronic device 10a, and the second dielectric body 340 transfers the radio signal to the receiving module 322 through the fourth dielectric body 360.

The radio signals transmitted from the transmitting modules 321 of the first and second electronic devices 10a and 102a are transmitted to the receiving modules 322 of the first and second electronic devices 10a and 102a through the first, second, third, and fourth dielectric bodies 330, 340, 350, and 360.

Figure 17:
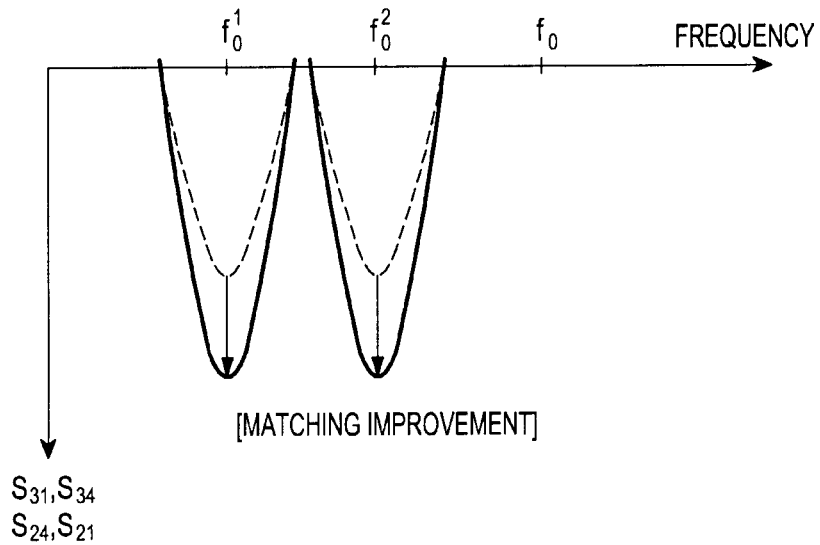
FIG. 17 is a graph showing the improvement of matching of first and second dielectric bodies according to various other embodiments of the present disclosure.
Figure 18:
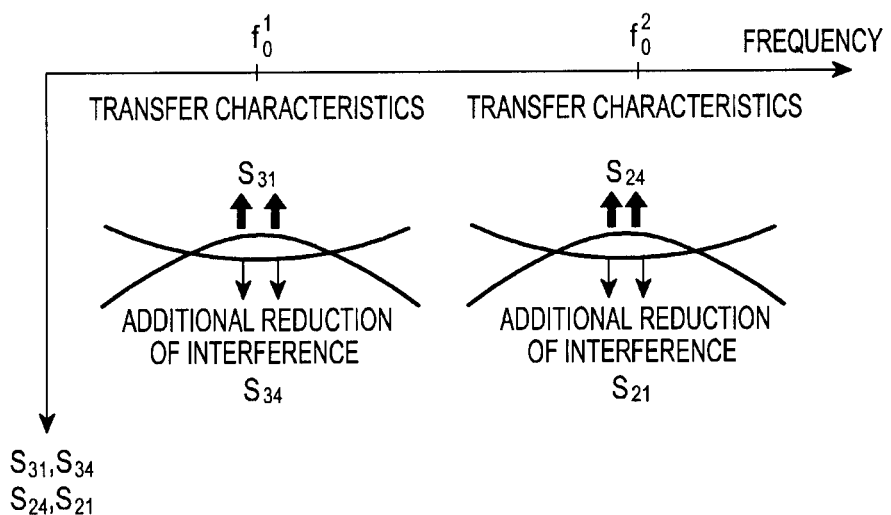
FIG. 18 is a graph showing the improvement of channel frequency transmission efficiency of first and second dielectric bodies according to various other embodiments of the present disclosure.

FIG. 17 is a graph showing a result of application of first, second, third, and fourth dielectric bodies 330, 340, 350, and 360 having different relative-dielectric constants according to various embodiments of the present disclosure, and FIG. 18 is a graph showing improvement of the transfer characteristics of a channel frequency of first, second, third, and fourth dielectric bodies 330, 340, 350, and 360 according to various embodiments of the disclosure.

As shown in FIG. 17, since the third and fourth dielectric bodies 350 and 360 provided in the first and second electronic devices 10a and 102a relatively mitigate the mismatch of the antenna feeding impedance of the near-field (short-range) communication module 320, the matching between each of the transmitting module 321 and the receiving module 322 and the first and second dielectric bodies 330 and 340 may be improved, thereby lowering input-reflection coefficients S31, S34, S24, and S21 of the transmitting module 321 and the receiving module 322 and improving the transfer efficiency of a channel frequency.

For example, as shown in FIGS. 17 and 18, two different channel frequencies generated by the difference between the relative-dielectric constants are $f_0^1$ and $f_0^2$, respectively, and S31, S34, S24 and S21 are input-reflection coefficients of the transmitting module 321 and the receiving module 322. The channel frequency of the transmitting module 321 and the channel frequency of the receiving module 322 are separated, thereby reducing inter-channel frequency interference. That is, a channel frequency separation effect can be obtained.

According to various embodiments of the present disclosure, as shown in FIGS. 15 and 16 described above, a near-field (short-range) communication antenna device 300 used in an electronic device may include: a cover unit 310 of a first electronic device 10a; a cover unit 310a of a second electronic device 102a; a circuit board 311 configured to be provided inside the cover unit; a near-field (short-range) communication module 320 configured to include a transmitting module 321 and a receiving module 322, which are mounted on the circuit board; a first dielectric body 330 configured to be provided between the cover unit and the near-field (short-range) communication module and configured to protrude a predetermined length from the cover unit so as to face the transmitting module; a second dielectric body 340 configured to be provided between the cover unit and the near-field (short-range) communication module and configured to protrude a predetermined length from the cover unit so as to face the receiving module; a third dielectric body 350 configured to be provided between the transmitting module and the first dielectric body; and a fourth dielectric body 360 configured to be provided between the receiving module and the second dielectric body.

According to various embodiments of the present disclosure, the first and second dielectric bodies may act as waveguides for transmitting radio signals of the transmitting module and the receiving module, and the third and fourth dielectric bodies may act as gaskets for transmitting radio signals of the transmitting module and the receiving module.

According to various embodiments of the present disclosure, the third and fourth dielectric bodies may include matching dielectric body sections According to various embodiments of the present disclosure, the third and fourth dielectric bodies may have relative-dielectric constants lower than those of the first and second dielectric bodies, or may have relative-dielectric constants the same as that of air. Since the third and fourth dielectric bodies having the configuration above may relatively attenuate the mismatch of the antenna feeding impedance of the near-field (short-range) communication module, the matching between each of the transmitting module and the receiving module and the first and second dielectric bodies can be improved, thereby lowering input-reflection coefficients of the transmitting module and the receiving module and improving the transfer efficiency of a channel frequency.

Hereinafter, an electronic device 10 adopting a near-field (short-range) communication antenna device 400, according to various other embodiments, will be described with reference to the accompanying drawings.

The overall operation of the near-field (short-range) communication antenna device included in the electronic device has been described above in the various embodiments of the present disclosure with reference to FIGS. 4A, 4B, and 6, and thus the description thereof will be omitted below.

Figure 19:
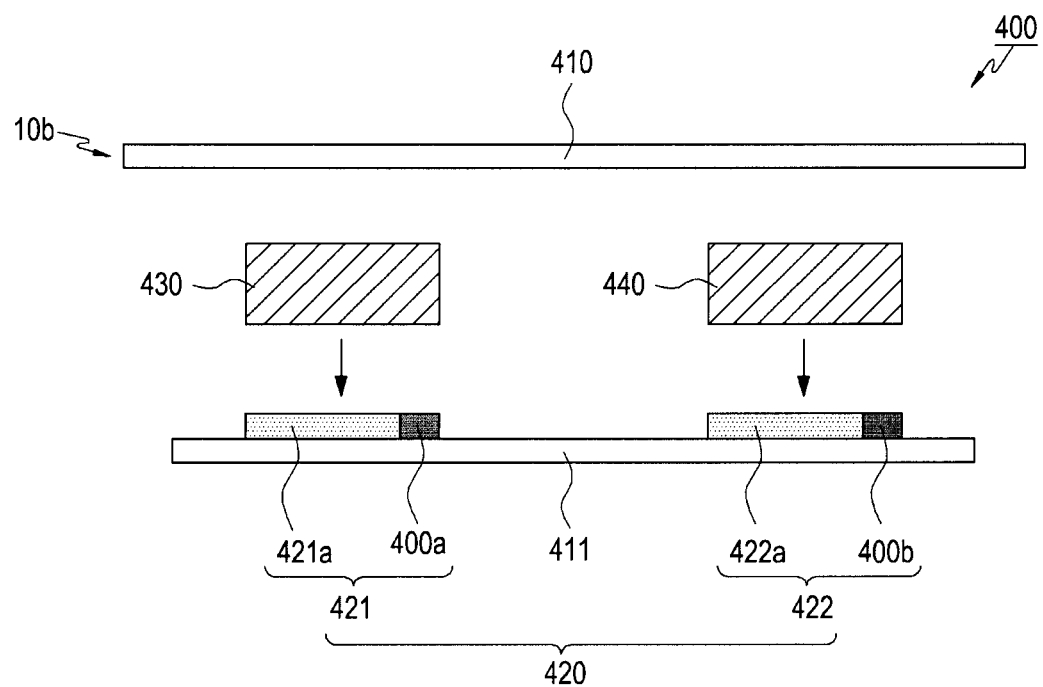
FIG. 19 is an exploded side sectional view showing a configuration example of a near-field (short-range) communication antenna device provided in an electronic device according to various other embodiments of the present disclosure.
Figure 20:
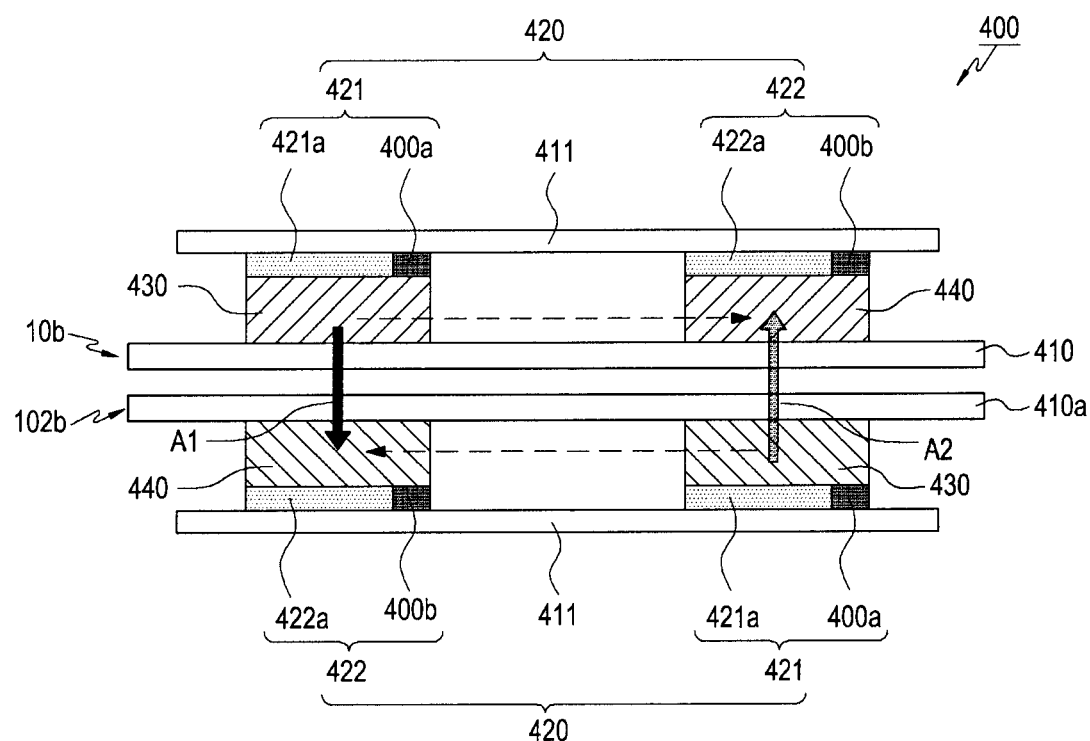
FIG. 20 is a side sectional view illustrating the usage state of a near-field (short-range) communication antenna device provided in an electronic device according to various other embodiments of the present disclosure.

FIG. 19 is an exploded side sectional view showing a configuration example of a near-field (short-range) communication antenna device 400 provided in an electronic device according to various other embodiments of the present disclosure, and FIG. 20 is a side sectional view illustrating the usage state of a near-field (short-range) communication antenna device 400 provided in an electronic device according to various other embodiments of the present disclosure.

Referring to FIGS. 19 and 20, according to various other embodiments, the electronic device 10b may be a first electronic device, and the external electronic device 102b may be a second electronic device. Hereinafter, the electronic device 10b will be referred to as a first electronic device, and the external electronic device 102b will be referred to as a second electronic device.

The near-field (short-range) communication antenna device 400 used in the first and second electronic device 10b and 102b may include a cover unit 410 of the first electronic device 10b, a cover unit 410a of the second electronic device, a circuit board 411, a near-field (short-range) communication module 420 including a transmitting module 421 and a receiving module 422, and first and second dielectric bodies 430 and 440.

For example, the near-field (short-range) communication module 420 may be configured to include a transmitting module 421 that has a transmitting circuit 421a (Tx IC) and a transmitting antenna (Tx Antenna) 400a and a receiving module 422 that has a receiving circuit 422a (Rx IC) and a receiving antenna (Rx Antenna) 400b.

The circuit board 411 may be provided inside the cover units 410 and 410a so as to integrally mount the near-field (short-range) communication module 420 thereon, which will be described later.

The electronic device cover unit 410 may be provided to face upper surfaces of the first and second dielectric bodies 430 and 440, which will be described later.

That is, the upper surfaces of the first and second dielectric bodies 430 and 440 face the inner surfaces of the electronic device cover units 410 and 410a.

The first dielectric body 430 may protrude a predetermined length from the transmitting module 421 so as to face the inner surface of the cover unit 410 or 410a such that the first dielectric body 430 is provided separately from the transmitting module 421, instead of being integrally provided on the upper surface of the transmitting module 421.

The second dielectric body 440 may protrude a predetermined length from the receiving module 422 so as to face the inner surface of the cover unit 410 or 410a such that the second dielectric body 440 is provided separately from the receiving module 422, instead of being integrally provided on the upper surface of the receiving module 422.

As described above, since the first and second dielectric bodies 430 and 440 are configured to be separately provided to face the cover units 410 and 410a, instead of being integrally provided on the inner surface thereof, and the transmitting and receiving modules 421 and 422 of the near-field (short-range) communication module 420 are integrally formed on the circuit board 411, it is possible to use and maintain an excellent channel frequency without radio interference between the electronic devices 10 in a limited space and to thus prevent the directions of antenna radiation patterns of the products from mismatching each other, thereby improving the transmission and reception efficiency of near-field (short-range) communication.

The first and second dielectric bodies 430 and 440 may act as waveguides for transmitting radio signals of the transmitting module 421 and the receiving module 422. In addition, the first and second dielectric bodies 430 and 440 may act as gaskets for transmitting radio signals of the transmitting module 421 and the receiving module 422.

A first surface of the first dielectric body 430 may be integrally formed on the transmitting module 421, and a second surface opposite the first surface of the first dielectric body 430 may face the inner surface of the cover unit 410 of the first electronic device 10b. A first surface of the second dielectric body 440 may be integrally formed on the receiving module 422, and a second surface of the second dielectric body 440 may face the inner surface of the cover unit 410 of the first electronic device 10b.

A first surface of the first dielectric body 430 may be integrally formed on the transmitting module 421, and a second surface of the first dielectric body 430 may face the inner surface of the cover unit 410a of the second electronic device 102b. A first surface of the second dielectric body 440 may be integrally formed on the receiving module 422, and a second surface of the second dielectric body 440 may face the inner surface of the cover unit 410a of the second electronic device 102b.

In this state, when the first and second electronic devices 10b and 102b approach each other for near-field (short-range) communication, the first dielectric body 430 integrally provided in the transmitting module 421 of the first electronic device 10b may face the second dielectric body 440 integrally provided in the receiving module 422 of the second electronic device 102b while the second dielectric body 440 integrally provided in the receiving module 422 of the first electronic device 10b may face the first dielectric body 430 integrally provided in the transmitting module 421 of the second electronic device 102b.

FIG. 20 described above is a diagram showing transfer paths of radio signals of the near-field (short-range) communication antenna device 400 according to various embodiments of the present disclosure.

Referring to FIG. 20, when the transmitting module 421 of the first electronic device 10b transmits a radio signal, the radio signal is transferred to the second dielectric body 440 integrally provided in the receiving module 422 of the second electronic device 102b through the first dielectric body 430 integrally provided in the transmitting module 421 of the first electronic device 10b, and the second dielectric body 440 transfers the transmitted radio signal to the receiving module 422.

For example, the radio signals from the transmitting module 421 to the receiving module 422 cab be concentrated through the inside of the first and second dielectric bodies 430 and 440, thereby reducing the channel frequency interference applied to the transmitting module 421 to the receiving module 422.

In addition, when the transmitting module 421 of the second electronic device 102b transmits a radio signal, the radio signal is transferred to the second dielectric body 440 integrally provided in the receiving module 422 of the first electronic device 10b through the first dielectric body 430 integrally provided in the transmitting module 421 of the second electronic device 102b, and the second dielectric body 440 transfers the transmitted radio signal to the receiving module 422.

The radio signals transmitted from the transmitting modules 421 of the first and second electronic devices 10b and 102b are transmitted to receiving modules 422 of the first and second electronic devices 10b and 102b through the first and second dielectric bodies 430 and 440.

For example, as shown in FIG. 20, the first and second dielectric bodies 430 and 440 of the cover unit 410 provided in the first electronic device 10b may be configured to have different relative-dielectric constants from each other and the first and second dielectric bodies 430 and 440 of the cover unit 410a provided in the second electronic device 102b may be configured to have different relative-dielectric constants from each other in the state in which the first and second dielectric bodies 430 and 440 are separated from the cover unit 410 and the transmitting and receiving modules 421 and 422 of the near-field (short-range) communication module 420 are integrally formed on the circuit board 411. More specifically, a path is shown, through which a radio signal (A1) transmitted from the transmitting module 421 of the cover unit 410 of the first electronic device 10b is effectively transferred to the receiving module 422 of the cover unit 410a of the second electronic device 102b. Another path is shown, through which a radio signal (A2) transmitted from the transmitting module 421 of the cover unit 410a of the second electronic device 102b is effectively transferred to the receiving module 422 of the cover unit 410 of the first electronic device 10b. In addition, since the first and second dielectric bodies 430 and 440 are configured to have different relative-dielectric constants from each other, it is possible to reduce the channel interference (G2) applied from the transmitting module 421 of the cover unit 410 of the first electronic device 10b to the receiving module 422 and to reduce the channel interference (G2) applied from the transmitting module 421 of the cover unit 410a of the second electronic device 102b to the receiving module 422. Accordingly, radio signals between the transmitting module 430 and the receiving module 422 are concentrated on the inside of the first and second dielectric bodies 430 and 440, thereby reducing the channel interference (G2) applied from the transmitting module 421 to the receiving module 422.

According to various embodiments of the present disclosure, as shown in FIGS. 19 and 20 described above, a near-field (short-range) communication antenna device 400 used in an electronic device may include: a cover unit 410 of a first electronic device 10b; a cover unit 410a of a second electronic device 102b; a circuit board 411 configured to be provided inside the cover unit; a near-field (short-range) communication module 420 configured to include a transmitting module 421 and a receiving module 422, which are mounted on the circuit board; a first dielectric body 430 configured to be provided on an upper surface of the transmitting module; and a second dielectric body 440 configured to be provided on an upper surface of the receiving module.

According to various embodiments of the present disclosure, the first and second dielectric bodies may act as waveguides for transmitting radio signals of the transmitting module and the receiving module.

According to various embodiments of the present disclosure, the first and second dielectric bodies may act as gaskets for transmitting radio signals of the transmitting module and the receiving module.

According to various embodiments of the present disclosure, a first surface of the first dielectric body may face an inner surface of the cover unit and a second surface opposite the first surface of the first dielectric body may face an upper surface of the transmitting module. In addition, a first surface of the second dielectric body may face the inner surface of the cover unit and a second surface opposite the first surface of the second dielectric body may face an upper surface of the receiving module.

Hereinafter, an electronic device 10 adopting a near-field (short-range) communication antenna device 500, according to various other embodiments, will be described with reference to the accompanying drawings.

The overall operation of the near-field (short-range) communication antenna device included in the electronic device has been described in the various embodiments of the present disclosure above with reference to FIGS. 4A, 4B, and 6, and thus a description thereof will be omitted below.

Figure 21A:
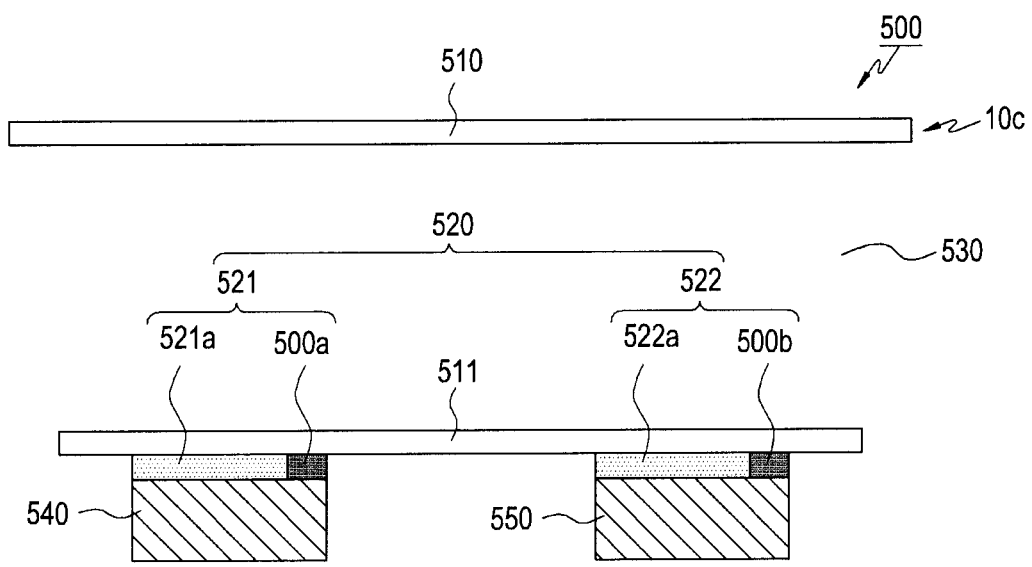
FIG. 21A is a side sectional view showing a configuration example of a near-field (short-range) communication antenna device provided in an electronic device according to various other embodiments of the present disclosure.
Figure 22A:
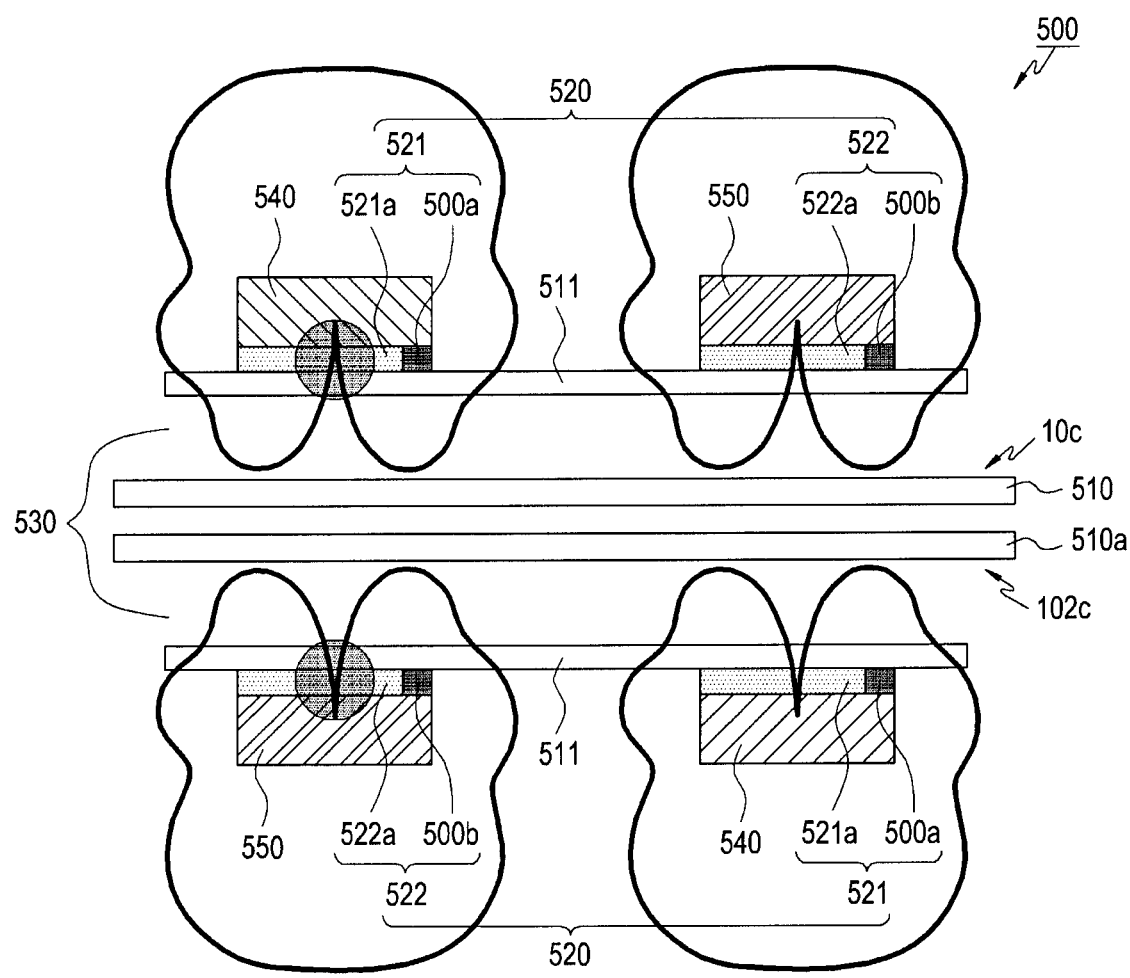
FIG. 22A is a block diagram showing a result before adjusting the radiation directivity of a near-field (short-range) communication antenna device provided in an electronic device according to various other embodiments of the present disclosure.
Figure 22B:
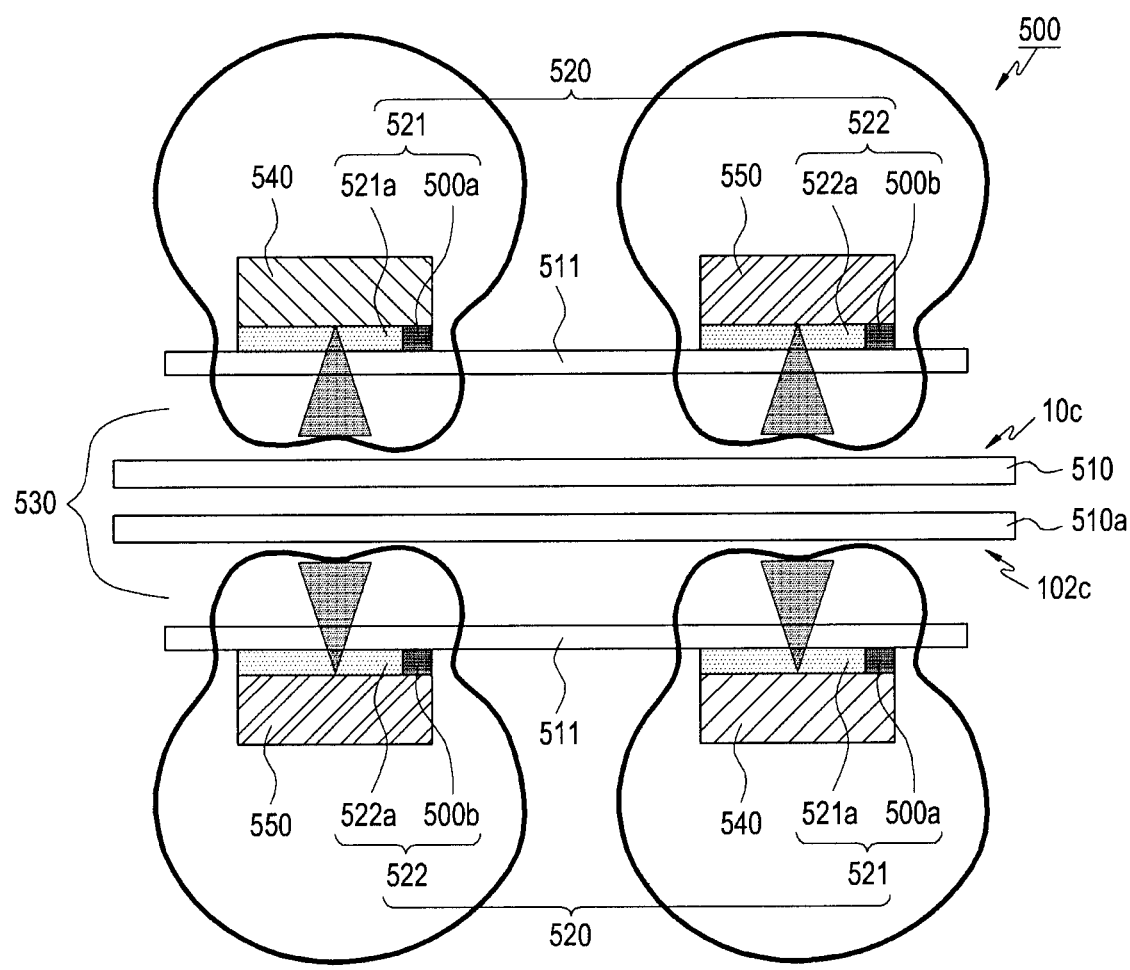
FIG. 22B is a block diagram showing a result of adjusting the radiation directivity of a near-field (short-range) communication antenna device provided in an electronic device according to various other embodiments of the present disclosure.

FIG. 21A is a side sectional view showing a configuration example of a near-field (short-range) communication antenna device 500 provided in an electronic device according to various other embodiments of the present disclosure. FIG. 22A is a side sectional view showing a configuration example of a near-field (short-range) communication antenna device 500 provided in an electronic device 10c and a graph showing a result before adjusting the radiation directivity thereof according to various other embodiments of the present disclosure, and FIG. 22B is a side sectional view showing a configuration example of a near-field (short-range) communication antenna device 500 provided in an electronic device 10c and a graph showing a result of adjusting the radiation directivity thereof according to various other embodiments of the present disclosure.

Referring to FIGS. 21A and 22A, according to various other embodiments, the electronic device 10c may be a first electronic device and the external electronic device 102c may be a second electronic device. Hereinafter, the electronic device 10c will be referred to as a first electronic device, and the external electronic device 102c will be referred to as a second electronic device.

The near-field (short-range) communication antenna device 500 used in the first and second electronic device 10c and 102c may include a cover unit 510 of the first electronic device 10c, a cover unit 510a of the second electronic device 102c, a circuit board 511, a near-field (short-range) communication module 520 including a transmitting module 521 and a receiving module 522, a gap 530, and first and second dielectric bodies 540 and 550.

The near-field (short-range) communication module 520 may be configured to include a transmitting module 521 that has a transmitting circuit 521a (Tx IC) and a transmitting antenna (Tx Antenna) 500a and a receiving module 522 that has a receiving circuit 522a (Rx IC) and a receiving antenna (Rx Antenna) 500b.

The near-field (short-range) communication module 520 including the transmitting module 521 and the receiving module 522 may be provided on a first surface of the circuit board 511, and the gap 530, which will be described later, may be provided on a second surface apposite the first surface of the circuit board 511. The circuit board 511 may be mounted inside the cover unit 510 of the electronic device.

The gap 530 may be formed under the cover unit 510 of the first electronic device 10c.

That is, the gap 530 may be provided on the first surface of the circuit board 511 and between the cover unit 510 and the near-field (short-range) communication module 520. The transmitting module 521 (Tx) and the receiving module 522 (Rx) may be provided on the second surface opposite the first surface of the circuit board 511.

The first dielectric body 540 may be provided on a first surface of the transmitting module 521 so as to protrude a predetermined length in the disposition direction of the transmitting module 521.

The second dielectric body 550 may be provided on a first surface of the receiving module 522 so as to protrude a predetermined length in the disposition direction of the receiving module 522.

As described above, the first and second dielectric bodies 540 and 550, which are configured to protrude a predetermined length from the first surfaces of the transmitting and receiving modules 521 and 522 of the near-field (short-range) communication module 520, may be provided on the first surface of the circuit board 511, and the gap 530 may be formed between the cover unit 510 and the near-field (short-range) communication module 520 on the second surface opposite the first surface of the circuit board 511. According to the near-field (short-range) communication module 500 having the above configuration, it is possible to use and maintain an excellent channel frequency without radio interference between the electronic devices in a limited space and to prevent the directions of antenna radiation patterns of the products from mismatching each other, thereby improving the transmission and reception efficiency of near-field (short-range) communication.

The first and second dielectric bodies 540 and 550 may act as waveguides for transmitting radio signals of the transmitting module 521 and the receiving module 522. Although the first and second dielectric bodies 540 and 550 are described as acting as waveguides, the present disclosure is not limited thereto. That is, the first and second dielectric bodies 540 and 550 may be variously configured and applied as long as they can form transfer paths of radio signals for securing near-field (short-range) communication performance. For example, the first and second dielectric bodies 540 and 550 may act as gaskets.

The transmitting module 521 is provided on the first surface of the circuit board 511, the first dielectric body 540 is integrally formed on the first surface of the transmitting module 521, and the gap 530 is formed on the second surface opposite the first surface of the circuit board 511. The gap 530 is formed between the second surface of the circuit board 511 and the cover unit 510.

Similarly, the receiving module 522 is provided on the first surface of the circuit board 511, the second dielectric body 550 is integrally formed on the first surface of the receiving module 522, and the gap 530 is formed on the second surface opposite the first surface of the circuit board 511. The gap 530 is formed between the second surface of the circuit board 511 and the cover unit 510.

When the cover units 510 and 510*a* of the first and second electronic device 10*c* and 102*c* approach each other for near-field (short-range) communication, the gap 530 formed on the first surface of the cover unit 510 of the first electronic device 10*c* gets close to the gap 530 formed in the first surface of the cover unit 510*a* of the second electronic device 102*c*. In this state, if the transmitting module 521 provided on the first surface of the circuit board 511 transmits a radio signal, the radio signal of the transmitting module 521 is transferred to the gap 530 of the second electronic device 102*c* through the gap 530 of the first electronic device 10*c*, and then the radio signal having passed through the gap 530 is transferred to the receiving module 522 of the second electronic device 102*c*.

When the transmitting module 521 of the second electronic device 102*c* transmits a radio signal, the transmitted signal is transferred to the gap 530 of the first electronic device 10*c* by passing through the gap 530 of the second electronic device 102*c*, and then the gap 530 transfers the same to the receiving module 522 of the first electronic device 10*c*.

At this time, the first and second dielectric bodies 540 and 550 integrally formed on the first surfaces of the transmitting module 521 and the receiving module 522 can concentrate the radio signals from the transmitting module 521 to the receiving module 522, thereby reducing the channel frequency interference applied to the transmitting module 521 and the receiving module 522.

Figure 21B:
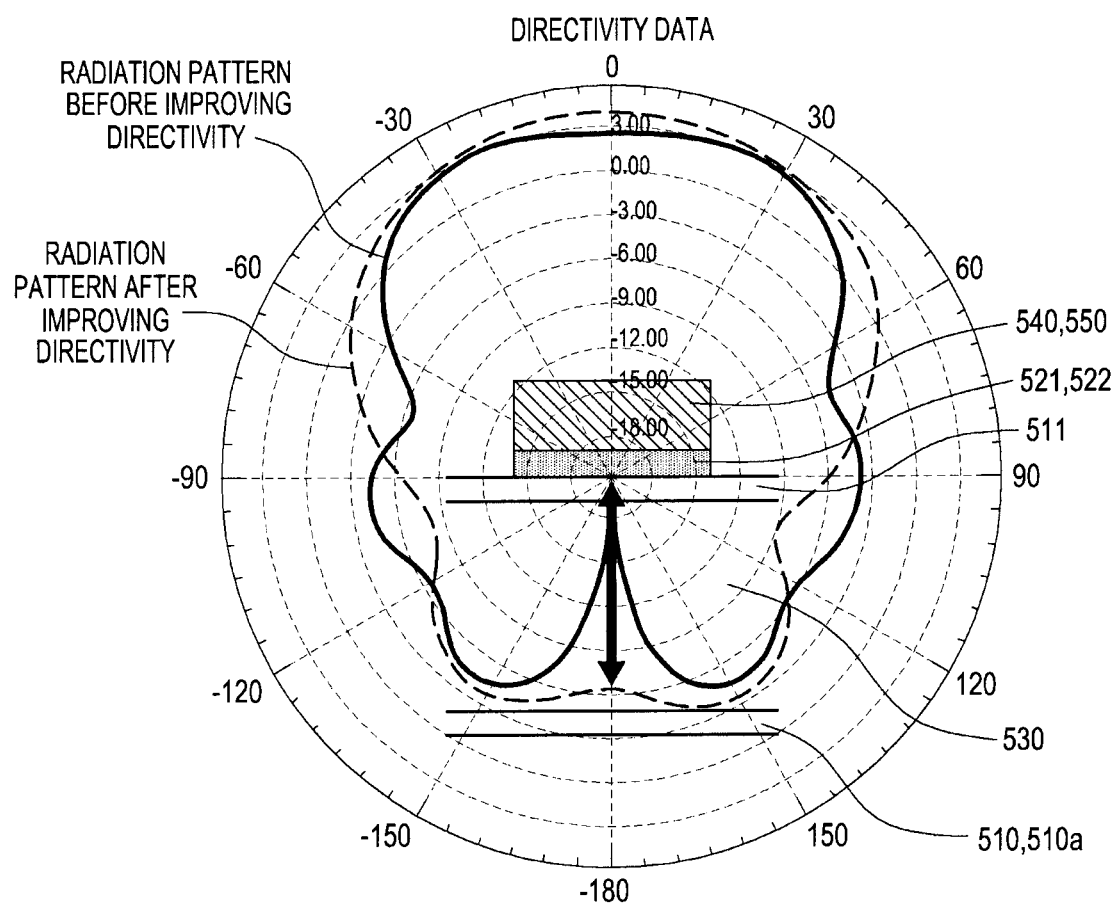
FIG. 21B is a graph showing directivity data of a near-field (short-range) communication antenna device provided in an electronic device according to various other embodiments of the present disclosure.

For example, FIG. 21B is a graph showing −180 degree-radiation directivity of a near-field (short-range) communication antenna device 500 provided in the electronic device before and after improving the same according to various other embodiments of the present disclosure. For example, the solid line shown in FIG. 21B denotes a radiation pattern before improving the −180 degree-radiation directivity using the first and second dielectric bodies, and the dotted line shown in FIG. 21B denotes a radiation pattern after improving the −180 degree-radiation directivity using the first and second dielectric bodies.

As shown in FIG. 21B, it can be seen that the directivity difference before and after the improvement for the first and second dielectric bodies 540 and 550 is about 15 dB. The radiation pattern in the direction of −180 degrees may be maximized or minimized using the first and second dielectric bodies 540 and 550.

For example, FIG. 22A is a block diagram showing a result before adjusting the radiation directivity of the near-field (short-range) communication antenna device 500 provided in the electronic device 10 according to various other embodiments of the present disclosure, and FIG. 22B is a graph showing a result of adjusting the radiation directivity of the near-field (short-range) communication antenna device 500 provided in the electronic device 10 according to various other embodiments of the present disclosure.

As shown in FIG. 22A, the transmitting module 521 and the receiving module 522 have nulls in the direction of −180 degrees before adjusting the radiation directivity, and thus the transmitting module 521 and the receiving module 522 have poor communication sensitivity. On the other hand, as shown in FIG. 22B, the transmitting module 521 and the receiving module 522 have enhanced radiation characteristics in the direction of −180 degrees after adjusting the radiation directivity, thereby strengthening the radio transmission/reception link intensity.

Therefore, by adopting the configuration in which the transmitting module 521 and the receiving module 522 are provided on the upper surface of the circuit board 511, the first and second dielectric bodies 540 and 550 are integrally provided on the upper surfaces of the transmitting module 521 and the receiving module 522, and the gap 530 is formed on the lower surface opposite the upper surface of the circuit board 511, it is possible to disturb upward-radiation directivity of the transmitting module 521 and the receiving module 522 by applying the first and second dielectric bodies 540 and 550, thereby alleviating downward-nulls or applying downward-directivity of the transmitting module 521 and the receiving module 522. As a result, it is possible to improve the efficiency of a radio transmission/reception link by strengthening the downward-radiation directivity of the transmitting module and the receiving module.

According to various embodiments of the present disclosure, as shown in FIGS. 21A and 22B described above, a near-field (short-range) communication antenna device 500 used in an electronic device may include: a cover unit 510 of a first electronic device 10*c*; a cover unit 510*a* of a second electronic device 102*c*; a circuit board 510 configured to be provided inside the cover unit; a near-field (short-range) communication module 520 configured to include a transmitting module 521 and a receiving module 522, which are mounted on a first surface of the circuit board; a gap 530 configured to be formed on a second surface opposite the first surface of the circuit board; a first dielectric body 540 configured to be provided in the transmitting module; and a second dielectric body 550 configured to be provided in the receiving module.

Hereinafter, an electronic device 10*c* adopting a near-field (short-range) communication antenna device 600, according to various other embodiments, will be described with reference to the accompanying drawings.

The overall operation of the near-field (short-range) communication antenna device included in the electronic device has been described in the various embodiments of the present disclosure above with reference to FIGS. 4A, 4B, and 6, and thus a description thereof will be omitted below.

Figure 23A:
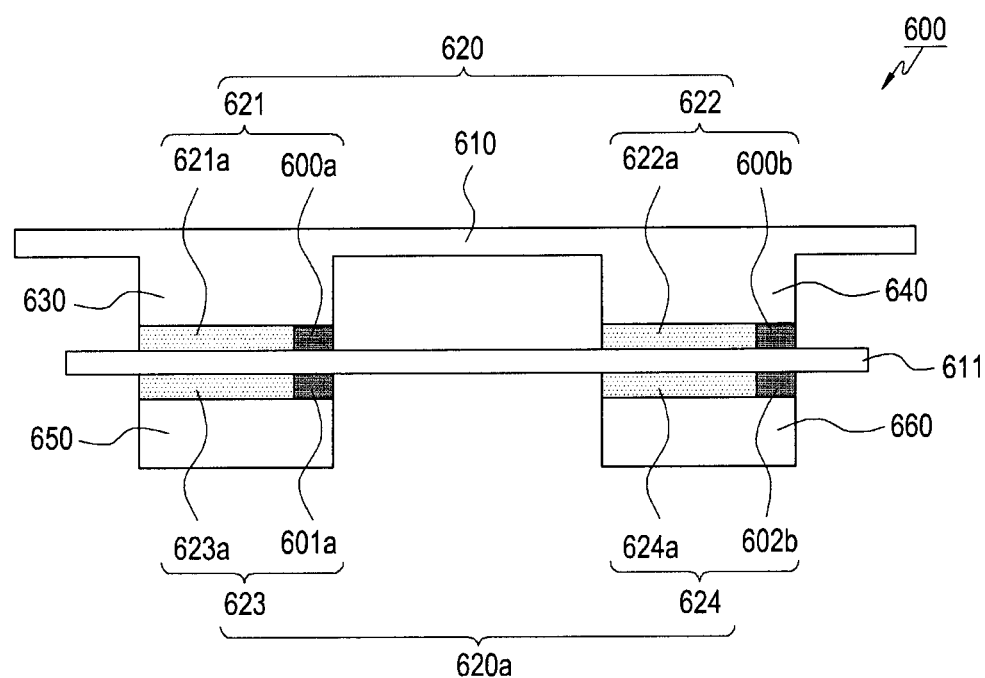
FIG. 23A is a side sectional view illustrating a configuration example of a near-field (short-range) communication antenna device provided in an electronic device according to various other embodiments of the present disclosure.
Figure 23B:
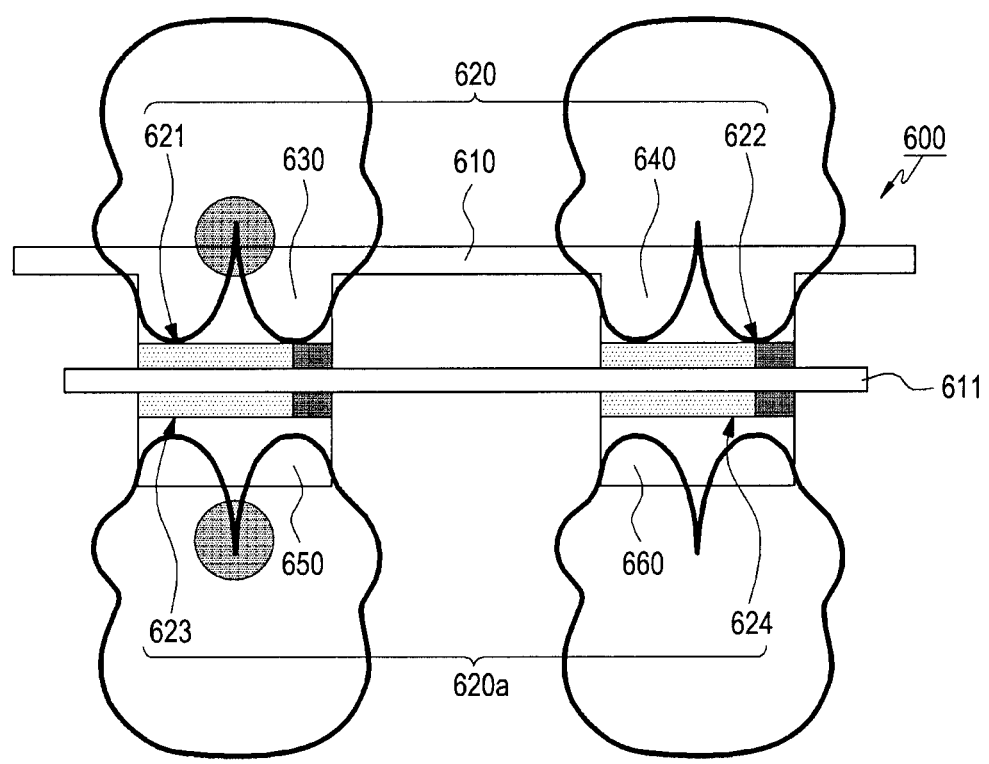
FIG. 23B is a graph showing the state in which interference between a transmitting module and a receiving module has been reduced as a result of optimizing a radiation pattern using first, second, third, and fourth dielectric bodies in the configuration of a near-field (short-range) communication antenna device provided in an electronic device according to various other embodiments of the present disclosure.
Figure 24A:
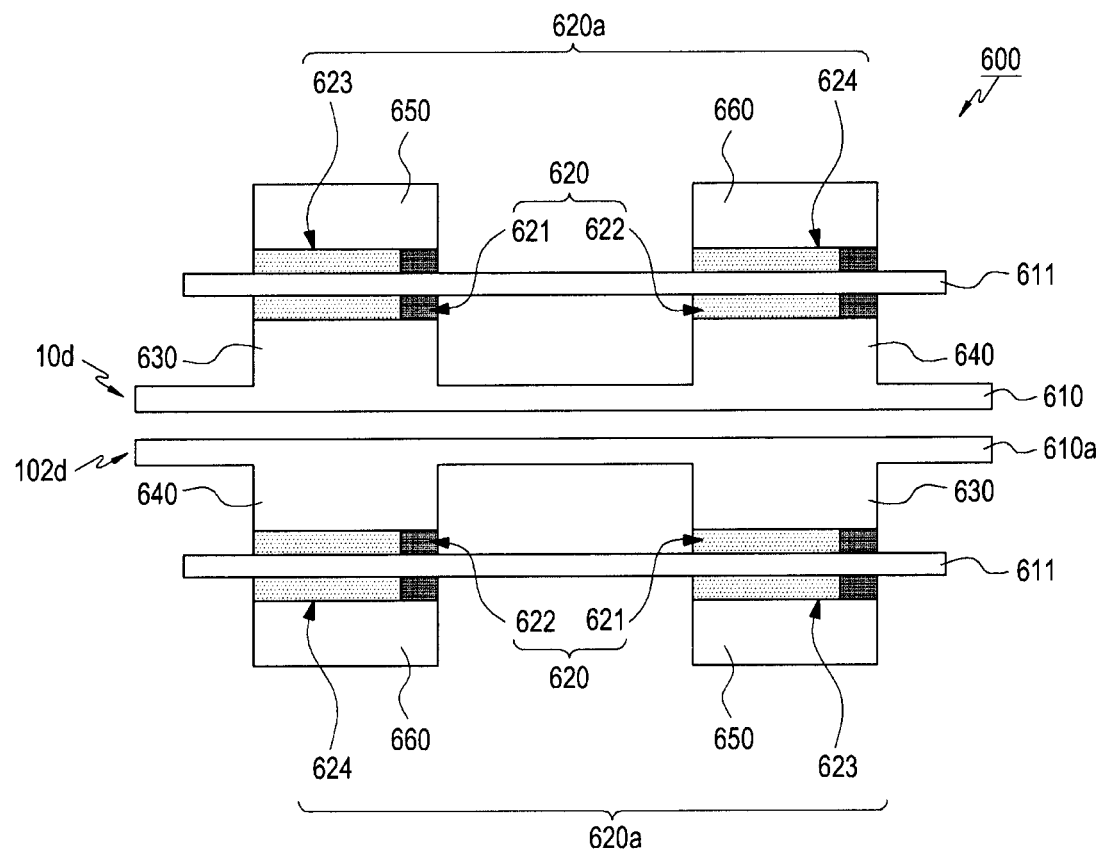
FIG. 24A is a side sectional view illustrating the usage state of a near-field (short-range) communication antenna device provided in an electronic device according to various other embodiments of the present disclosure.
Figure 24B:
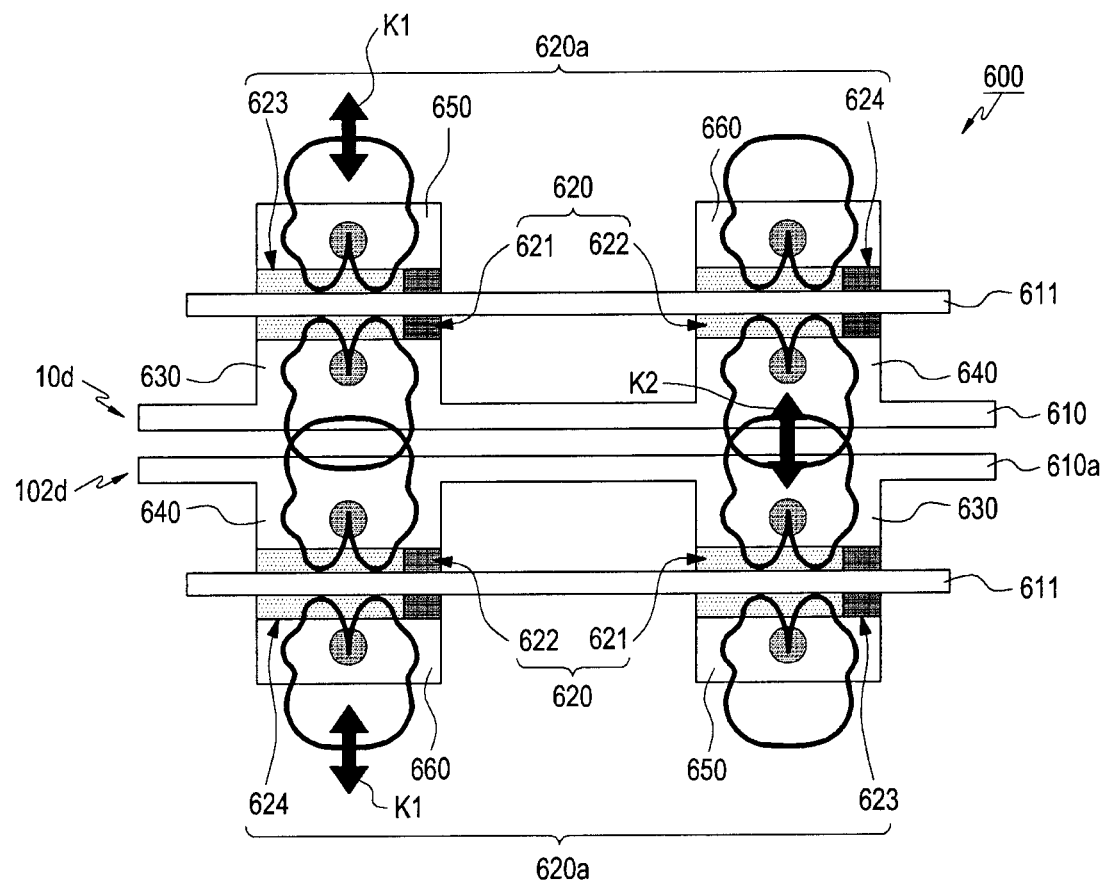
FIG. 24B is a graph showing the state in which interference between a transmitting module and a receiving module has been reduced as a result of optimizing a radiation pattern using first, second, third, and fourth dielectric bodies in the configuration of a near-field (short-range) communication antenna device provided in an electronic device according to various other embodiments of the present disclosure.

FIG. 23A is a side sectional view illustrating a configuration example of a near-field (short-range) communication antenna device 600 provided in an electronic device according to various other embodiments of the present disclosure, and FIG. 23B is a graph showing the state in which interference between a transmitting module and a receiving module has been reduced as a result of optimizing a radiation pattern using first, second, third, and fourth dielectric bodies in the configuration of a near-field (short-range) communication antenna device 600 provided in an electronic device according to various other embodiments of the present disclosure. FIG. 24A is a side sectional view illustrating the usage state of a near-field (short-range) communication antenna device 600 provided in an electronic device according to various other embodiments of the present disclosure, and FIG. 24B is a graph showing the state in which interference between a transmitting module and a receiving module has been reduced as a result of optimizing a radiation pattern using first, second, third, and fourth dielectric bodies in the configuration of a near-field (short-range) communication antenna device 600 provided in an electronic device according to various other embodiments of the present disclosure.

Referring to FIGS. 23A and 24A, according to various embodiments, the electronic device 10*d* may be a first electronic device and the external electronic device 102*d* may be a second electronic device. Hereinafter, the electronic device 10*d* will be referred to as a first electronic device, and the external electronic device 102*d* will be referred to as a second electronic device.

For example, the near-field (short-range) communication antenna device 600 used in the first and second electronic device 10*d* and 102*d* may include a cover unit 610 of the first electronic device 10*d*, a cover unit 610*a* of the second electronic device 102*d*, a circuit board 611, first and second near-field (short-range) communication modules 620 and 620*a* including first and second transmitting modules 621 and 623 and first and second receiving modules 622 and 624, and first, second, third and fourth dielectric bodies 630, 640, 650, and 660.

As shown in FIG. 24A, the first near-field (short-range) communication module 620 may be configured to include a first transmitting module 621 that has a transmitting circuit 621*a* (Tx IC) and a transmitting antenna (Tx Antenna) 600*a* and a first receiving module 622 that has a receiving circuit 622*a* (Rx IC) and a receiving antenna (Rx Antenna) 600*b*. The second near-field (short-range) communication module 620*a* may be configured to include a second transmitting module 623 that has a transmitting circuit 623*a* (Tx IC) and a transmitting antenna (Tx Antenna) 601*a* and a second receiving module 624 that has a receiving circuit 624*a* (Rx IC) and a receiving antenna (Rx Antenna) 602*b*.

The first near-field (short-range) communication module 620 including the first transmitting module 621 and the first receiving module 622 may be provided on the first surface of the circuit board 611, and the second near-field (short-range) communication module 620*a* including the second transmitting module 623 and the second receiving module 624 may be provided on the second surface opposite the first surface of the circuit board 611.

The electronic device cover unit 610 may have the first and second dielectric bodies 630 and 640 integrally provided thereon, which will be described later.

That is, the first and second dielectric bodies 630 and 640 may be integrally formed on the inner surface of the cover unit 610 of the first electronic device 10*d*.

The first transmitting module 621 and the first receiving module 622 may be provided on the first surface of the circuit board 611 so as to face the first and second dielectric bodies 630 and 640.

The second transmitting module 623 and the second receiving module 624 may be provided on the second surface opposite the first surface of the circuit board 611 so as to face the third and fourth dielectric bodies 650 and 660.

The first and second dielectric bodies 630 and 640 protrude a predetermined length from the inner surfaces of the cover units 610 and 610*a* so as to face the first transmitting module 621 and the first receiving module 622.

The third and fourth dielectric bodies 650 and 660 protrude a predetermined length from the inner surfaces of the cover units 610 and 610*a* so as to face the second transmitting module 623 and the second receiving module 624.

As described above, by adopting the configuration in which the first and second dielectric bodies 630 and 640 are directly connected to the first transmitting module 621 and the first receiving module 622 of the near-field (short-range) communication module 620 and the third and fourth dielectric bodies 650 and 660 are directly connected to the second transmitting module 623 and the second receiving module 624 of the near-field (short-range) communication module 620, it is possible to use and maintain an excellent channel frequency without radio interference between the electronic devices in a limited space and to prevent the directions of antenna radiation patterns of the products from mismatching each other, thereby improving the transmission and reception efficiency of near-field (short-range) communication.

The first and second dielectric bodies 640 and 650 may act as waveguides for transmitting radio signals of the transmitting module and the receiving module. Although the first and second dielectric bodies 640 and 650 are described as acting as waveguides, the present disclosure is not limited thereto. That is, the first and second dielectric bodies 640 and 650 may be variously configured and applied as long as they can form transfer paths of radio signals for securing near-field (short-range) communication performance. For example, the first and second dielectric bodies 640 and 650 may act as gaskets.

The first transmitting module 621 and the first receiving module 622 may be provided on the first surface of the circuit board 611, and the first and second dielectric bodies 630 and 640 may be integrally formed on the first surfaces of the first transmitting module 621 and the first receiving module 622. The second transmitting module 623 and the second receiving module 624 may be provided on the second surface opposite the first surface of the circuit board 611, and the third and fourth dielectric bodies 650 and 660 may be integrally formed on the first surfaces of the second transmitting module 623 and the second receiving module 624.

As shown in FIG. 24A, the cover units 610 and 610*a* of the first and second electronic devices 10*d* and 102*d* approach each other for near-field (short-range) communication, and the first dielectric body 630 provided in the first transmitting module 621 of the first electronic device 10*d* may face the second dielectric body 640 provided in the first receiving module 622 of the second electronic device 102*d* while the second dielectric body 640 provided in the first receiving module 622 of the first electronic device faces the first dielectric body 630 provided in the first transmitting module 621 of the second electronic device.

Referring to FIG. 24B, when the first transmitting module 621 of the first electronic device 10*d* transmits a radio signal, the radio signal may be transferred to the second dielectric body 640 provided in the first receiving module 622 of the second electronic device 102*d* through the first dielectric body 630 provided in the first transmitting module 621 of the first electronic device 10*d*, and the second dielectric body 640 transfers the transmitted radio signal to the first receiving module 622.

For example, the radio signal transmitted from the first transmitting module 621 provided on the first surface of the circuit board 611 is transferred to the first receiving module 622 of the second electronic device through the first and second dielectric bodies 630 and 640.

In addition, when the first transmitting module 621 of the second electronic device 102*d* transmits a radio signal, the radio signal may be transferred to the second dielectric body 640 provided in the first receiving module 622 of the first electronic device 10*d* through the first dielectric body 630 provided in the first transmitting module 621 of the second electronic device 102*d*, and the second dielectric body 640 transfers the transmitted radio signal to the first receiving module 622.

The radio signals from the first transmitting module 621 to the first receiving module 622 may be concentrated through the inside of the first and second dielectric bodies 630 and 640, thereby reducing the channel frequency interference applied to the first transmitting module 621 and the first receiving module 622.

For example, FIG. 24B is a diagram illustrating the external link state (K1) and the internal link state (K2) without interference between the first and second transmitting modules and the first and second receiving modules in the state in which the near-field (short-range) communication antenna device 600 provided in the electronic device, according to various other embodiments of the present disclosure, has nulls in the direction of −180 degrees.

Referring to FIG. 24B, as a result of optimizing a radiation pattern in the direction of −180 degrees using the first, second, third, and fourth dielectric bodies 630, 640, 650, and 660, it is possible to generate the external link state (K1) and the internal link state (K2) without interference between the first and second transmitting modules 621 and 623 and the first and second receiving modules 622 and 624, thereby mitigating undesired interference between the transmitting modules and receiving modules. Accordingly, the near-field (short-range) communication antenna device 600 may improve the radio transmission/reception link efficiency between the transmitting modules and the receiving modules.

According to various embodiments of the present disclosure, as shown in FIGS. 23A to 24B described above, a near-field (short-range) communication antenna device 600 used in an electronic device may include: a cover unit 610 of a first electronic device 10d; a cover unit 610a of a second electronic device 102d; a circuit board 611 configured to be provided inside the cover unit; a first near-field (short-range) communication module 620 configured to include a first transmitting module 621 and a first receiving module 622, which are mounted on a first surface of the circuit board 611; a second near-field (short-range) communication module 620a configured to include a second transmitting module 623 and a second receiving module 624, which are provided on a second surface opposite the first surface of the circuit board 611; first and second dielectric bodies 630 and 640 configured to be provided between the cover unit and the near-field (short-range) communication module and configured to protrude a predetermined length from the cover unit so as to face the first transmitting module and the first receiving module; and third and fourth dielectric bodies 650 and 660 configured to face the second transmitting module and the second receiving module.

According to various embodiments of the present disclosure, the first, second, third, and fourth dielectric bodies may serve as waveguides for transmitting radio signals of the transmitting module and the receiving module.

According to various embodiments of the present disclosure, the first, second, third, and fourth dielectric bodies may serve as gaskets for transmitting radio signals of the transmitting module and the receiving module.

Figure 25:
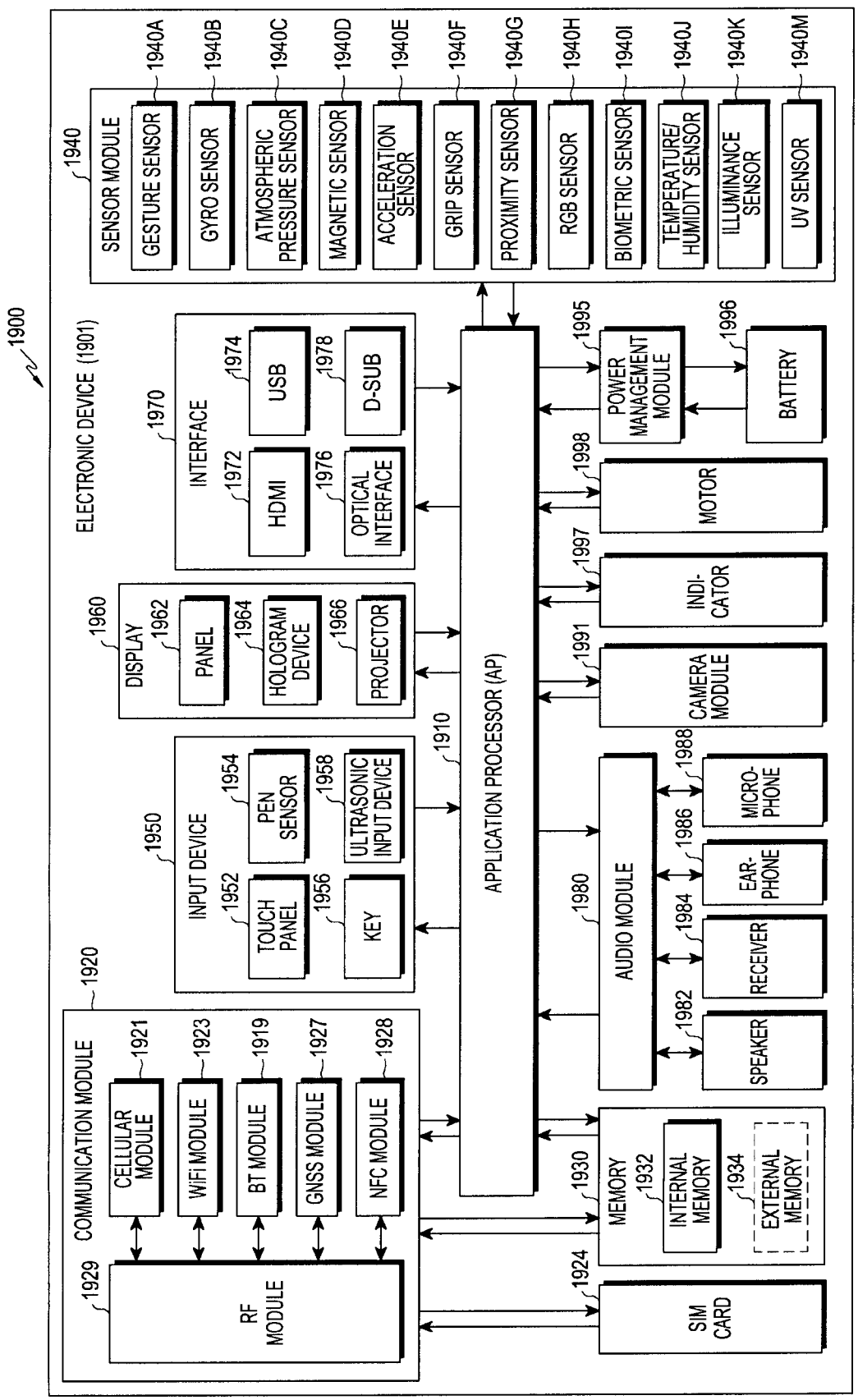
FIG. 25 is a block diagram illustrating a detailed configuration of an electronic device according to various embodiments of the present disclosure.

FIG. 25 is a block diagram of an electronic device 1901 according to various embodiments of the present disclosure. The electronic device 1901, for example, may include all or some of the elements of the electronic device 10 shown in FIG. 1. The electronic device 1901 may include one or more processors {e.g., application processors (AP)} 1910, a communication module 1920, a subscriber identification module 1924, a memory 1930, a sensor module 1940, an input device 1950, a display 1960, an interface 1970, an audio module 1980, a camera module 1991, a power management module 1995, a battery 1996, an indicator 1997, or a motor 1998.

The processor 1910, for example, may control a multitude of hardware or software elements connected with the processor 1910, and may perform the processing of a variety of data and a calculation by executing an operating system or application programs. The processor 1910 may be implemented by, for example, a system on chip (SoC). According to an embodiment, the processor 1910 may further include a graphic processing unit (GPU) and/or an image signal processor. The processor 1910 may include at least some (e.g., the cellular module 1921) of the elements shown in FIG. 19. The processor 1910 may load instructions or data received from other elements (e.g., a non-volatile memory) to a volatile memory to thus process the same, and may store a variety of data in a non-volatile memory.

The communication module 1920 may have a configuration the same as or similar to that of the communication interface 170 of FIG. 3. The communication module 1920, for example, may include a cellular module 1921, a Wi-Fi module 1923, a Bluetooth module 1925, a GNSS module 1927 (e.g., a GPS module, a Glonass module, the Beidou module, or the Galileo module), an NFC module 1928, and a radio frequency (RF) module 1929.

The cellular module 1921, for example, may provide services of voice calls, video calls, text messaging, or the Internet through communication networks. According to an embodiment, the cellular module 1921 may perform identification and verification of the electronic device 1901 in communication networks using the subscriber identification module (e.g., a SIM card) 1924. According to an embodiment, the cellular module 1921 may perform at least some of the functions provided by the processor 1910. According to an embodiment, the cellular module 1921 may include a communication processor (CP).

For example, each of the Wi-Fi module 1923, the Bluetooth module 1925, the GNSS module 1927, and the NFC module 1928 may include a processor for processing data transmitted and received through the corresponding module. According to an embodiment, at least some (e.g., two or more) of the cellular module 1921, the Wi-Fi module 1923, the Bluetooth module 1925, the GNSS module 1927, or the NFC module 1928 may be included in a single integrated chip (IC) or IC package.

The RF module 1929, for example, may transmit and receive communication signals (e.g., RF signals). The RF module 1929 may include, for example, a transceiver, a power amp module (PAM), a frequency filter, a low-noise amplifier (LNA), antennas, or the like. According to another embodiment, at least one of the cellular module 1921, the Wi-Fi module 1923, the Bluetooth module 1925, the GNSS module 1927, or the NFC module 1928 may transmit and receive RF signals through a separate RF module.

The subscriber identification module 1924, for example, may include a card that adopts a subscriber identification module card and/or an embedded SIM, and may contain inherent identification information {e.g., an integrated circuit card identifier (ICCID)} or subscriber information {e.g., an international mobile subscriber identity (IMSD)}.

The memory 1930 (e.g., the memory 130) may include an internal memory 1932 or an external memory 1934. The internal memory 1932, for example, may include at least one of volatile memories {e.g., a dynamic RAM (DRAM), a static RAM (SRAM), a synchronous dynamic RAM (SDRAM), or the like} or non-volatile memories {e.g., an one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, a solid state drive (SSD), or the like}.

The external memory 1934 may include a flash drive, and may further include, for example, compact flash (CF), secure digital (SD), micro secure digital (Micro-SD), mini secure digital (Mini-SD), extreme digital (xD), a multi-media card (MMC), a memory stick, or the like. The external memory 1934 may be functionally and/or physically connected with the electronic device 1901 through any of various interfaces.

The sensor module 1940, for example, may measure physical quantities, or may detect the operation state of the electronic device 1901 to thereby convert the measured or detected information to electric signals. The sensor module 1940 may include at least one of, for example, a gesture sensor 1940A, a gyro-sensor 1940B, an atmospheric pressure sensor 1940C, a magnetic sensor 1940D, an acceleration sensor 1940E, a grip sensor 1940F, a proximity sensor 1940G, a color sensor 1940H {e.g., a red-green-blue (RGB) sensor}, a biometric sensor 1940I, a temperature/humidity sensor 1940J, an illuminance sensor 1940K, or an ultraviolet (UV) sensor 1940M. Additionally or alternatively, the sensor module 1940, for example, may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1940 may further include a control circuit for controlling one or more sensors included therein. In some embodiments, the electronic device 1901 may further include a processor as a part of the processor 1910 or separately from the processor 1910, which is configured to control the sensor module 1940, thereby controlling the sensor module 1940 while the processor 1910 is in a sleep mode.

The input device 1950, for example, may include a touch panel 1952, a (digital) pen sensor 1954, keys 1956, or an ultrasonic input device 1958. The touch panel 1952 may use at least one of, for example, a capacitive type, a pressure-sensitive type, an infrared type, or an ultrasonic type. In addition, the touch panel 1952 may further include a control circuit. The touch panel 1952 may further include a tactile layer, thereby providing a user with a tactile reaction.

For example, the (digital) pen sensor 1954 may be a part of the touch panel, or may include a separate recognition sheet. The keys 1956 may include, for example, physical buttons, optical keys, or a keypad. The ultrasonic input device 1958 may detect ultrasonic waves that are generated in the input means through a microphone (e.g., a microphone 1988), thereby identifying data corresponding to the detected ultrasonic waves.

The display 1960 (e.g., the display 160) may include a panel 1962, a hologram device 1964, or a projector 1966. The panel 1962 may include a configuration the same as, or similar to, the display 160 of FIG. 3. The panel 1962 may be implemented to be, for example, flexible, transparent, or wearable. The panel 1962 may be configured with the touch panel 1952 as a single module. The hologram device 1964 may display 3D images in the air using light interference. The projector 1966 may display images by projecting light onto a screen. The screen may be positioned, for example, inside or outside the electronic device 1901. According to an embodiment, the display 1960 may further include a control circuit for controlling the panel 1962, the hologram device 1964, or the projector 1966.

The interface 1970 may include, for example, at least one of a high-definition multimedia interface (HDMI) 1972, a universal serial bus (UBS) 1974, an optical interface 1976, or a D-subminiature (D-sub) interface 1978. The interface 1970 may be included in, for example, the communication interface 170 shown in FIG. 3. Additionally or alternatively, the interface 1970 may include, for example, a mobile high-definition link (MHL) interface, a secure digital (SD) card/multi-media card (MMC) interface, or an infrared data association (IrDA) standard interface.

The audio module 1980, for example, may convert a sound into an electric signal, and vice versa. At least some elements of the audio module 1980 may be included, for example, in the input/output interface 150 shown in FIG. 3 For example, the audio module 1980 may process voice information that is input or output through a speaker 1982, a receiver 1984, earphones 1986, or a microphone 1988.

The camera module 1991, for example, may be a device for photographing still and moving images, and, according to an embodiment, the camera module 1991 may include one or more image sensors (e.g., a front sensor or a rear sensor), lenses, an image signal processor (ISP), or a flash (e.g., an LED or a xenon lamp).

The power management module 1995, for example, may manage power of the electronic device 1901. According to an embodiment, the power management module 1995 may include a power management integrated circuit (PMIC), a charger integrated circuit (IC), or a battery or fuel gauge. The PMIC may be implemented as a wired charging type and a wireless charging type. The wireless charging type may encompass, for example, a magnetic resonance type, a magnetic induction type, or an electromagnetic wave type, and additional circuits for wireless charging, such as coil loops, resonance circuits, or rectifiers, may be provided. The battery gauge may measure, for example, the remaining power of the battery 1996, a charging voltage, current, or temperature. The battery 1996 may include, for example, a rechargeable battery or a solar battery.

The indicator 1997 may display a specific state (e.g., a booting state, a message state, or a charging state) of the whole or a part (e.g., the processor 1910) of the electronic device 1901. The motor 1998 may convert an electric signal to a mechanical vibration, and may provide a vibration or a haptic effect. Although it is not shown in the drawings, the electronic device 1901 may include a processing device (e.g., a GPU) for supporting mobile TV. The processing device for supporting mobile TV may process media data according to standards such as, for example, digital multimedia broadcasting (DMB), digital video broadcasting (DVB), or mediaFlo™.

The respective elements described in the present specification may be configured by one or more components, and the names of the elements may vary depending on the type of electronic device. In various embodiments, the electronic device may be configured to include at least one of the elements described in the present specification, and may exclude some elements, or may further include other elements. In addition, a single entity may be configured by a combination of some of the elements of the electronic device, according to various embodiments, so as to perform functions the same as those of the original elements.

Figure 26:
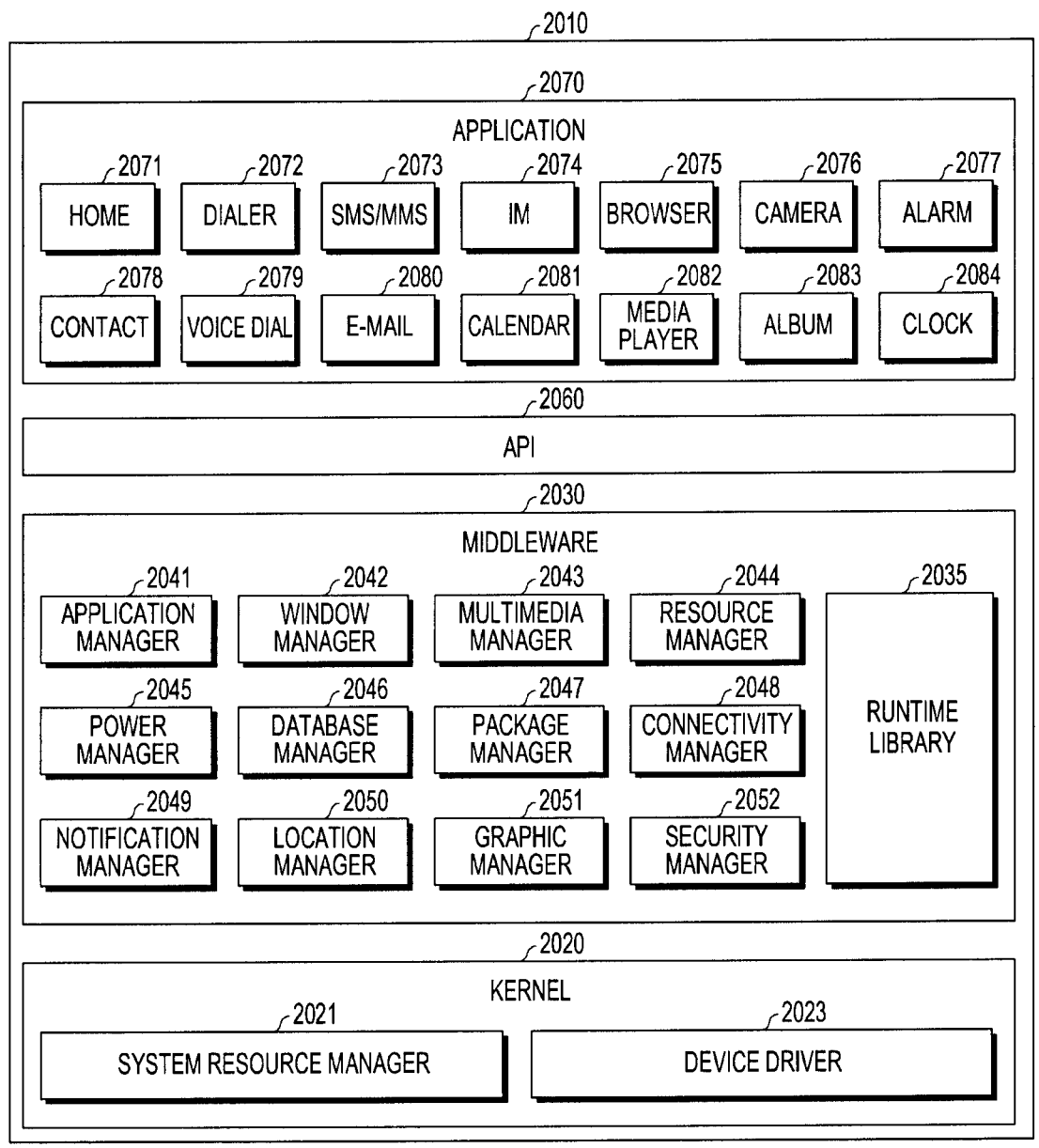
FIG. 26 is a block diagram of a program module according to various other embodiments of the present disclosure.

FIG. 26 is a block diagram of a program module, according to various embodiments. According to an embodiment, the program module 2010 (e.g., the programs 140) may include an operating system (OS) for controlling resources that are related to the electronic device (e.g., the electronic device 10) and/or various applications (e.g., the application programs 147) that are operated under the operating system. For example, the operating system may be Android, iOS, Windows, Symbian, Tizen, Bada, or the like.

The program module 2010 may include a kernel 2020, middleware 2030, an application programming interface (API) 2060, and/or applications 2070. At least some of the program module 2010 may be preloaded in the electronic device, or may be downloaded from external electronic devices (e.g., the electronic devices 102 and 104 or the server 106).

The kernel 2020 (e.g., the kernel 141), for example, may include a system resource manager 2021 and/or a device driver 2020. The system resource manager 2021 may perform control, allocation, or collection of the system resources. According to an embodiment, the system resource manager 2021 may include a processor management unit, a memory management unit, or a file system management unit. The device driver 2023 may include, for example, a display driver, a camera driver, a Bluetooth driver, a shared memory driver, a USB driver, a keypad driver, a Wi-Fi driver, an audio driver, or an inter-process communication (IPC) driver.

The middleware 2030, for example, may provide functions required in common for the applications 2070, or may provide the applications 2070 with various functions through the API 2060 in order to allow the applications 2070 to effectively use the limited system resources in the electronic device. According to an embodiment, the middleware 2030 (e.g., the middleware 143) may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, or a security manager 2052.

The runtime library 2035, for example, may include a library module that a compiler uses in order to add new functions through programming languages while the applications 2070 are executed. The runtime library 2035 may perform input/output management, memory management, or a function of an arithmetic calculation.

The application manager 2041, for example, may manage a life cycle of at least one of the applications 2070. The window manager 2042 may manage GUI resources used on the screen. The multimedia manager 2043 may identify formats for reproducing various media files, and may perform encoding or decoding of media files using a codec corresponding to each format. The resource manager 2044 may manage resources, such as source codes, memories, or storage spaces of one or more applications 2070.

The power manager 2045, for example, may manage a battery or power by operating in association with a basic input/output system (BIOS), and may provide power information necessary for the operation of the electronic device. The database manager 2046 may create, retrieve, or change a database that is to be used in one or more applications 2070. The package manager 2047 may manage the installation or update of the applications that are distributed in the form of a package file.

The connectivity manager 2048, for example, may manage a wireless connection, such as Wi-Fi or Bluetooth. The notification manager 2049 may display or notify of events (such as received messages, appointments, or proximity notifications) to the user without disturbance. The location manager 2050 may manage location information of the electronic device. The graphic manager 2051 may manage graphic effects to be provided to the user or user interfaces related thereto. The security manager 2052 may provide a general security function required for the system security or user authentication. According to an embodiment, in the case of the electronic device (e.g., the electronic device 10) adopting a phone call function, the middleware 2030 may further include a telephony manager for managing the functions of a voice call or a video call of the electronic device.

The middleware 2030 may include a middleware module to form a combination of various functions of the above-described elements. The middleware 2030 may provide a module that is specialized according to the type of operating system in order to provide differentiated functions. In addition, the middleware 2030 may dynamically exclude some of the typical elements or add new elements.

The API 2060 (e.g., the API 145), for example, may be a group of API programming functions, and may be provided as a different configuration according to an operating system. For example, one set of APIs may be provided to each platform in the case of Android or iOS, and two or more sets of APIs may be provided to each platform in the case of Tizen.

The applications 2070 (e.g., the application programs 147) may include one or more applications that execute functions of home 2071, a dialer 2072, SMS/MMS 2073, instant messaging (IM) 2074, a browser 2075, a camera 2076, an alarm 2077, contacts 2078, a voice dial 2079, e-mail 2080, a calendar 2081, a media player 2082, an album 2083, a clock 2084, healthcare (e.g., measuring the amount of exercise or blood glucose), providing environment information (e.g., providing atmospheric pressure, humidity, or temperature information), or the like.

According to an embodiment, the applications 2070 may include an application (hereinafter, referred to as "information-exchange application" for the convenience of explanation) that supports the exchange of information between the electronic device (e.g., the electronic device 10) and the external electronic device (e.g., the electronic device 102 or 104). The information-exchange application, for example, may include a notification relay application for relaying specific information to the external electronic devices, or may include a device management application for managing the external electronic devices.

For example, the notification relay application may include a function of transferring notification information generated in other applications (e.g., the SMS/MMS application, the e-mail application, the healthcare application, or the environment information application) of the electronic device to the external electronic device (e.g., the electronic device 102 or 104). In addition, the notification relay application, for example, may receive notification information from the external electronic device to thus provide the same to the user.

The device management application, for example, may manage (e.g., install, delete, or update): one or more functions {e.g., turning on and off the external electronic device (or some components thereof) or adjusting the brightness (or resolution) of a display} of the external electronic device (e.g., the electronic device 102 or 104) that communicates with the electronic device; applications executed in the external electronic device; or services (e.g., a phone call service or a messaging service) provided by the external electronic device.

According to an embodiment, the applications 2070 may include applications that are designated according to the attributes (e.g., the healthcare application of a mobile medical device) of the external electronic device (e.g., the electronic device 102 or 104). According to an embodiment, the applications 2070 may include applications that are received from the external electronic device (e.g., the server 106 or the electronic device 102 or 104). According to an embodiment, the applications 2070 may include preloaded applications or third party applications that can be downloaded from a server. The names of the elements of the program module 2010, according to the embodiment, may vary depending on the type of operating system.

According to various embodiments, at least some of the program module 2010 may be implemented by software, firmware, hardware, or a combination thereof. At least some of the program module 2010, for example, may be implemented (e.g., executed) by the processor (e.g., the processor 120 shown in FIG. 3). At least some of the program module 2010, for example, may include modules, program routines, sets of instructions, or processors for executing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

As described above, the near-field (short-range) communication antenna device used in the electronic device, according to various embodiments of the present disclosure, is not limited to the above-described embodiments and drawings, and it will be obvious to those skilled in the art that the near-field (short-range) communication antenna device may be variously substituted, modified, and changed within the scope of the present disclosure.

The invention claimed is:

1. An electronic device comprising:
   a cover;
   a circuit board disposed apart from the cover;
   a transmitting module and a receiving module disposed on the circuit board, wherein the transmitting module is configured to transmit a signal with a transmit channel frequency and the receiving module is configured to receive another signal with a receive channel frequency, wherein the transmit channel frequency is the same as the receive channel frequency;
   a first dielectric body disposed between the cover and the transmitting module, and facing the transmitting module; and
   a second dielectric body disposed between the cover and the receiving module, and facing the receiving module,
   wherein a relative-dielectric constant of the first dielectric body of the transmitting module and a relative-dielectric constant of the second dielectric body of the receiving module are different in order to separate the transmit channel frequency from the receive channel frequency.

2. The electronic device of claim 1, wherein the first dielectric body and the second dielectric body are integrated on an inner surface of the cover.

3. The electronic device of claim 1, wherein the first dielectric body and the second dielectric body are configured to guide electromagnetic waves for transmitting the signal of the transmitting module and the another signal of the receiving module.

4. The electronic device of claim 1, wherein the first dielectric body and the second dielectric body are protruded from the cover facing the transmitting module and the receiving module.

5. The electronic device of claim 4, wherein the cover is one of a battery cover, a window, a touch panel, a front case, and a rear case.

6. The electronic device of claim 4, wherein the first dielectric body and the second dielectric body have shapes of one of a rectangle, a square, a cylinder, a cone, a pyramid, or a triangular pyramid.

7. The electronic device of claim 4, wherein the electronic device comprises first electronic device and second electronic device,
   wherein the first dielectric body integrally provided in the covers of the first electronic device or the second electronic device faces the transmitting module and the second dielectric body integrally provided in the covers of the first electronic device or the second electronic device faces the receiving module, and
   wherein when the first electronic device and the second electronic device approach each other for near-field (short-range) communication, the first dielectric body provided in the transmitting module of the first electronic device faces the second dielectric body provided in the receiving module of the second electronic device and the second dielectric body provided in the receiving module of the first electronic device faces the first dielectric body provided in the transmitting module of the second electronic device.

8. The electronic device of claim 1, further wherein:
the first dielectric body is protruded from the cover facing the transmitting module; and
the second dielectric body is protruded from the cover facing the receiving module,
the electronic device further comprising:
a third dielectric body disposed between the transmitting module and the first dielectric body; and
a fourth dielectric body disposed between the receiving module and the second dielectric body.

9. The electronic device of claim 8, wherein the first dielectric body and the second dielectric body are configured to guide electromagnetic waves for transmitting radio signals of the transmitting module and the receiving module, and
wherein a relative-dielectric constant of the third dielectric body and a relative-dielectric constant of the fourth dielectric body are lower than the relative-dielectric constant of the first dielectric body and the relative-dielectric constant of the second dielectric body, and the third dielectric body and the fourth dielectric body configured to guide electromagnetic waves for transmitting radio signals of the transmitting module and the receiving module.

10. The electronic device of claim 8, wherein the third dielectric body and the fourth dielectric body comprise matching dielectric body sections.

11. The electronic device of claim 8, wherein the third dielectric body and the fourth dielectric body have relative-dielectric constants lower than those of the first dielectric body and the second dielectric body or have relative-dielectric constants the same as that of air.

12. The electronic device of claim 1, wherein:
the first dielectric body is disposed on an upper surface of the transmitting module; and
the second dielectric body is disposed on the upper surface of the receiving module.

13. The electronic device of claim 12, wherein a first surface of the first dielectric body faces an inner surface of the cover and a second surface opposite the first surface of the first dielectric body faces an upper surface of the transmitting module, and
wherein a first surface of the second dielectric body faces the inner surface of the cover and a second surface opposite the first surface of the second dielectric body faces an upper surface of the receiving module.

14. The electronic device of claim 1, wherein the first dielectric body is disposed in the transmitting module; and the second dielectric body is disposed in the receiving module, the electronic device further comprising:
a gap between a second surface opposite a first surface of the circuit board and the cover.

15. The electronic device of claim 1, further comprising:
a second transmitting module;
a second receiving module; and
a third dielectric body and a fourth dielectric body facing the second transmitting module and the second receiving module,
wherein the second transmitting module and the second receiving module are disposed on a second surface opposite a first surface of the circuit board, and
wherein the first dielectric body and the second dielectric body are protruded from the cover facing the transmitting module and the receiving module.

16. The electronic device of claim 15, wherein the first dielectric body, the second dielectric body, the third dielectric body, and the fourth dielectric body are configured to guide electromagnetic waves for transmitting radio signals of the transmitting module and the receiving module.

17. The electronic device of claim 1, wherein the transmitting module is disposed between the first dielectric body and the cover and the receiving module is disposed between the second dielectric body and the cover.

* * * * *